US012688697B2

(12) United States Patent
Hayashi et al.

(10) Patent No.: US 12,688,697 B2
(45) Date of Patent: Jul. 21, 2026

(54) RENDERING SYSTEM, DISPLAY SYSTEM, MOVING VEHICLE, RENDERING METHOD, AND NON-TRANSITORY STORAGE MEDIUM FOR CORRECTING A RENDERING LOCATION OF A MARKER

(71) Applicant: Panasonic Intellectual Property Management Co., Ltd., Osaka (JP)

(72) Inventors: Shohei Hayashi, Kyoto (JP); Terumitsu Suenaga, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 482 days.

(21) Appl. No.: 17/885,943

(22) Filed: Aug. 11, 2022

(65) Prior Publication Data

US 2022/0383645 A1    Dec. 1, 2022

Related U.S. Application Data

(63) Continuation of application No. PCT/JP2021/003570, filed on Feb. 1, 2021.

(30) Foreign Application Priority Data

Feb. 12, 2020    (JP) ................................. 2020-021887

(51) Int. Cl.
*G06V 20/58*        (2022.01)
*B60K 35/10*        (2024.01)
        (Continued)

(52) U.S. Cl.
CPC .............. *G06V 20/58* (2022.01); *B60K 35/10* (2024.01); *B60K 35/22* (2024.01); *B60K 35/60* (2024.01);
        (Continued)

(58) Field of Classification Search
CPC ........ G06V 20/58; B60K 35/00; B60K 35/23; B60K 35/28; B60K 35/29;
        (Continued)

(56) References Cited

U.S. PATENT DOCUMENTS

| | | | |
|---|---|---|---|
| 10,837,788 B1 * | 11/2020 | Kentley-Klay | .... G01C 21/3438 |
| 2013/0177080 A1 * | 7/2013 | Nakashima | .......... H04N 19/521 |
| | | | 375/240.14 |

(Continued)

FOREIGN PATENT DOCUMENTS

| | | |
|---|---|---|
| CN | 106470877 | 3/2017 |
| JP | 2008-046744 | 2/2008 |

(Continued)

OTHER PUBLICATIONS

A method for constructing an actual virtual map of the road scene for recognition of dangerous situations in real time, by Nina Krapukhina, Nikolay Kamenov, 2017 4th International Conference on Transportation Information and Safety (ICTIS) (2017, pp. 545-550), Aug. 1, 2017 (Year: 2017).*

(Continued)

*Primary Examiner* — Jennifer Mehmood
*Assistant Examiner* — Heath E. Wells
(74) *Attorney, Agent, or Firm* — Greenblum & Bernstein, P.L.C.

(57)        ABSTRACT

A rendering system includes a rendering unit and a correction unit. The rendering unit renders, based on a result of detection by a detection system, a marker corresponding to a location of a target. The detection system is installed in a moving vehicle for the purpose of detecting the target. The correction unit corrects, based on correction data, the location of the target in accordance with the result of detection by the detection system and thereby determines a location of the marker to be rendered by the rendering unit. The (Continued)

correction data is obtained based on at least traveling information about a traveling condition of the moving vehicle.

14 Claims, 11 Drawing Sheets

(51) Int. Cl.

| | |
|---|---|
| *B60K 35/22* | (2024.01) |
| *B60K 35/23* | (2024.01) |
| *B60K 35/28* | (2024.01) |
| *B60K 35/29* | (2024.01) |
| *B60K 35/60* | (2024.01) |
| *B60K 35/90* | (2024.01) |
| *B60K 37/20* | (2024.01) |
| *G06T 7/70* | (2017.01) |

(52) U.S. Cl.
CPC .............. *B60K 35/90* (2024.01); *B60K 37/20* (2024.01); *G06T 7/70* (2017.01); *B60K 35/23* (2024.01); *B60K 35/28* (2024.01); *B60K 35/29* (2024.01); *B60K 2360/179* (2024.01); *B60K 2360/191* (2024.01); *G06T 2207/30204* (2013.01); *G06T 2207/30261* (2013.01)

(58) Field of Classification Search
CPC ........ B60K 2360/179; B60K 2360/191; B60K 2360/177; G06T 7/70; G06T 2207/30204; G06T 2207/30261; G08G 1/166
USPC ......................................................... 382/103
See application file for complete search history.

(56) References Cited

U.S. PATENT DOCUMENTS

| | | | | |
|---|---|---|---|---|
| 2015/0109444 A1* | 4/2015 | Zhang | ..................... | B60Q 9/008 348/148 |
| 2015/0243171 A1* | 8/2015 | Emura | ................... | G08G 1/165 340/435 |
| 2017/0146796 A1 | 5/2017 | Kosaka et al. | | |
| 2017/0197617 A1* | 7/2017 | Penilla | ................. | G08G 1/0129 |
| 2018/0240258 A1 | 8/2018 | Kosaka et al. | | |
| 2018/0268564 A1* | 9/2018 | Sumikawa | ........... | B60K 35/235 |
| 2018/0312110 A1 | 11/2018 | Takae et al. | | |
| 2018/0321030 A1 | 11/2018 | Kido et al. | | |
| 2018/0322787 A1 | 11/2018 | Shimizu | | |
| 2019/0042862 A1* | 2/2019 | Itamochi | ................ | B60Q 9/008 |
| 2019/0103026 A1* | 4/2019 | Liu | ........................ | G06V 10/25 |
| 2019/0114921 A1* | 4/2019 | Cazzoli | .................. | G06V 20/58 |
| 2019/0135306 A1* | 5/2019 | Won | ...................... | G08G 1/167 |
| 2019/0196184 A1* | 6/2019 | Takizawa | ............. | G01C 21/365 |
| 2019/0244515 A1* | 8/2019 | Hacker | .................. | B60K 35/28 |
| 2021/0295577 A1* | 9/2021 | Xue | ........................ | G06T 11/60 |

FOREIGN PATENT DOCUMENTS

| | | |
|---|---|---|
| JP | 2017-076324 | 4/2017 |
| JP | 6279090 | 2/2018 |
| JP | 2019-202698 | 11/2019 |
| WO | 2017/056157 | 4/2017 |
| WO | 2017/068692 | 4/2017 |

OTHER PUBLICATIONS

Office Action issued by the China National Intellectual Property Administration (CNIPA) in Chinese Patent Application No. 202180014145.5, dated Apr. 27, 2023, together with an English language translation.

Search Report issued by the China National Intellectual Property Administration (CNIPA) in Chinese Patent Application No. 202180014145.5, dated Apr. 27, 2023, together with an English language translation.

Official Communication issued in International Patent Application No. PCT/JP2021/003570, dated Apr. 20, 2021, along with an English translation thereof.

\* cited by examiner

RENDERING SYSTEM, DISPLAY SYSTEM, MOVING VEHICLE, RENDERING METHOD, AND NON-TRANSITORY STORAGE MEDIUM FOR CORRECTING A RENDERING LOCATION OF A MARKER

CROSS-REFERENCE TO RELATED APPLICATIONS

The present application is a Bypass Continuation of International Application No. PCT/JP2021/003570 filed on Feb. 1, 2021, which is based upon, and claims the benefit of priority to, Japanese Patent Application No. 2020-021887, filed on Feb. 12, 2020. The entire contents of both applications are hereby incorporated by reference.

TECHNICAL FIELD

The present disclosure generally relates to a rendering system, a display system, a moving vehicle, a rendering method, and a non-transitory storage medium. More particularly, the present disclosure relates to a rendering system, a display system, a moving vehicle, a rendering method, and a non-transitory storage medium, all of which are configured or designed to render an image based on the result of detection by a detection system for detecting a target.

BACKGROUND ART

JP 2008-46744 A discloses an approaching moving vehicle display device for displaying an image of an approaching moving vehicle on a screen in a vehicle. The approaching moving vehicle display device recognizes, based on an image captured by a camera installed at a crossing, for example, an approaching moving vehicle (moving vehicle) traveling along the road in front of the camera and calculates, based on the location information of the approaching moving vehicle thus recognized, a virtual display location of the moving vehicle on the screen.

The approaching moving vehicle display device of JP 2008-46744 A also has the correction capability of correcting, based on a time lag between a point in time when an image is captured and a point in time when the image is displayed on a display unit, the virtual display location of the approaching moving vehicle. Specifically, the correction capability includes calculating, based on the image captured, the distance between the camera and the approaching moving vehicle, the moving velocity of the approaching moving vehicle, and other parameters, and correcting, based on the result of calculation and the time lag, the virtual display location of the approaching moving vehicle.

According to the configuration of JP 2008-46744 A, however, the camera is basically installed stationarily at the crossing, for example. Thus, if the detection system (including the camera) for detecting the target (such as the approaching moving vehicle) is movable, the display device of JP 2008-46744 A cannot eliminate a shift, involved with the movement of the detection system itself, of the display location.

SUMMARY

The present disclosure provides a rendering system, a display system, a moving vehicle, a rendering method, and a non-transitory storage medium, all of which may reduce such a shift, involved with the movement of the detection system itself, of the display location.

A rendering system according to an aspect of the present disclosure includes a rendering unit and a correction unit. The rendering unit renders, based on a result of detection by a detection system, a marker corresponding to a location of the target. The detection system is installed in a moving vehicle for the purpose of detecting the target. The correction unit corrects, based on correction data, the location of the target in accordance with the result of detection by the detection system and thereby determines a location of the marker to be rendered by the rendering unit. The correction data is obtained based on at least traveling information about a traveling condition of the moving vehicle.

A display system according to another aspect of the present disclosure includes the rendering system described above and a display device that displays thereon the marker rendered by the rendering system.

A moving vehicle according to still another aspect of the present disclosure includes the display system described above and a moving vehicle body to be equipped with the display system.

A rendering method according to yet another aspect of the present disclosure includes rendering processing and correction processing. The rendering processing includes rendering, based on a result of detection by a detection system, a marker corresponding to a location of the target. The detection system is installed in a moving vehicle for the purpose of detecting the target. The correction processing includes correcting, based on correction data, the location of the target in accordance with the result of detection by the detection system and thereby determining a location of the marker to be rendered in the rendering processing. The correction data is obtained based on at least traveling information about a traveling condition of the moving vehicle.

A non-transitory storage medium according to yet another aspect of the present disclosure stores thereon a program designed to cause one or more processors to perform the rendering method described above.

BRIEF DESCRIPTION OF DRAWINGS

The figures depict one or more implementations in accordance with the present teaching, by way of example only, not by way of limitations. In the figures, like reference numerals refer to the same or similar elements.

FIG. 1 is a schematic block diagram illustrating a configuration for a rendering system and display system according to a first embodiment;

FIG. 3 is a bird's-eye view illustrating the situation shown in FIG. 2;

FIG. 11 is a schematic block diagram illustrating a configuration for a rendering system and display system according to a second embodiment.

DETAILED DESCRIPTION

First Embodiment (1) Overview

Figure 1:
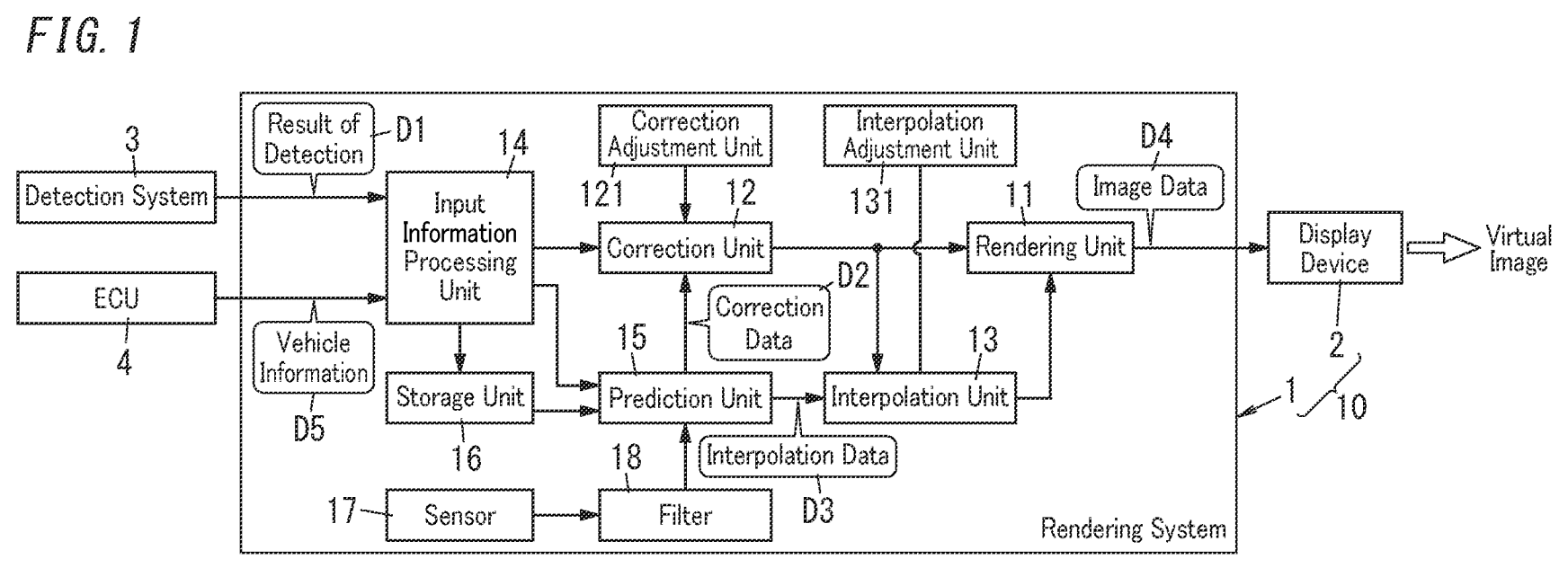
Figure 2:
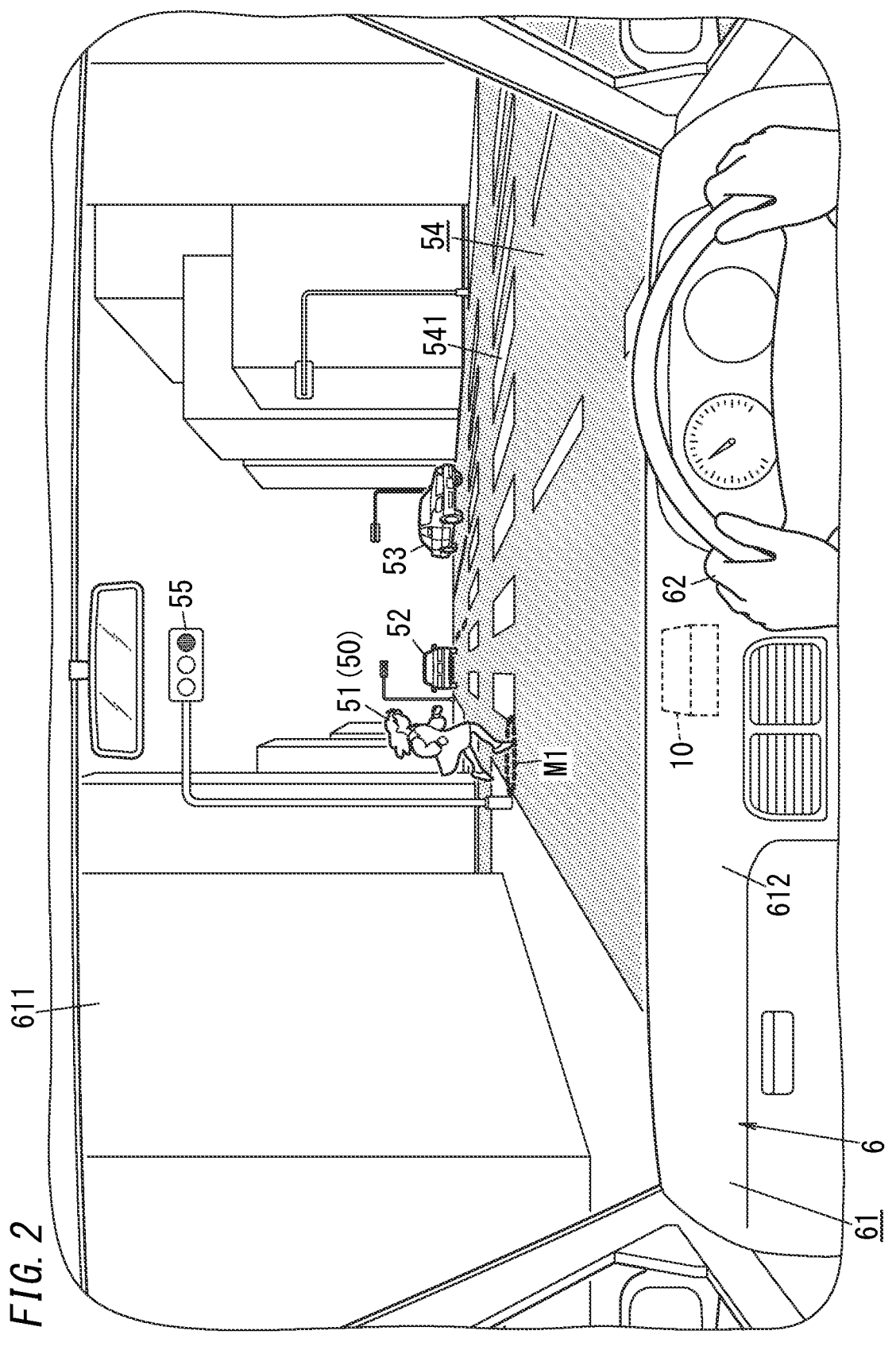
FIG. 2 illustrates a user's view to describe an exemplary operation of the display system.

First, an overview of a rendering system 1 according to an exemplary embodiment will be described with reference to FIGS. 1-3.

A rendering system 1 according to this embodiment is a system for rendering a marker M1 (see FIG. 2) based on a result of detection D1 by a detection system 3. The detection system 3 is a system for detecting a target 50 (see FIG. 2). In this embodiment, the detection system 3 is installed in a moving vehicle 6 (see FIG. 2).

In this embodiment, the rendering system 1 and a display device 2 together form a display system 10. In other words, the display system 10 according to this embodiment includes the rendering system 1 and the display device 2. The display device 2 is a device for displaying thereon the marker M1 rendered by the rendering system 1.

Figure 3:
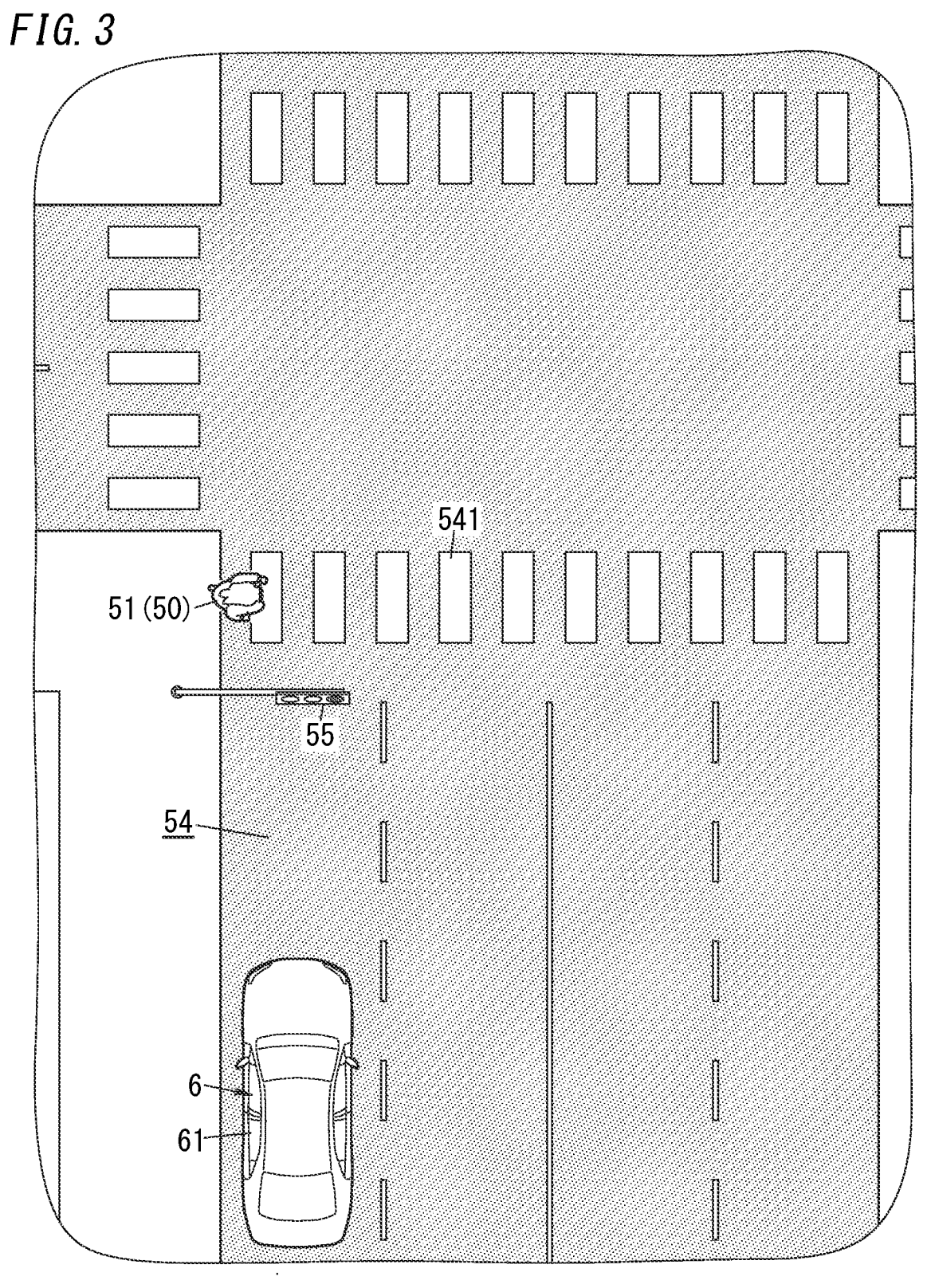

This rendering system 1 renders, when a pedestrian, for example, is detected as the target 50 by the detection system 3 for detecting the pedestrian in front of a moving vehicle 6 as shown in FIGS. 2 and 3, a marker M1 corresponding to the location of the target 50. Then, displaying the marker M1, rendered by the rendering system 1, on the display device 2 allows the marker M1 to be displayed as an encircled marker at the feet of the target 50 (pedestrian) as viewed from the user 62 as shown in FIG. 2, for example.

The display system 10 according to this embodiment is installed in the moving vehicle body 61 (see FIG. 2) and forms, along with the moving vehicle body 61, the moving vehicle 6 (see FIG. 2). In other words, the moving vehicle 6 according to this embodiment includes the display system 10 and the moving vehicle body 61. The moving vehicle body 61 is equipped with the display system 10.

On this premise, a rendering system 1 according to this embodiment includes a rendering unit 11 and a correction unit 12. The rendering unit 11 renders, based on the result of detection D1 by the detection system 3, a marker M1 corresponding to the location of a target 50. The detection system 3 is installed in the moving vehicle 6 for the purpose of detecting the target 50. The correction unit 12 corrects, based on correction data D2, the location of the target 50 in accordance with the result of detection D1 by the detection system 3 and thereby determines a location of the marker M1 to be rendered by the rendering unit 11. In this case, the correction data D2 is obtained based on at least traveling information about the traveling condition of the moving vehicle 6.

According to this configuration, the rendering unit 11 renders the marker M1 at a rendering location that has been subjected to correction by the correction unit 12 based the correction data D2, not at a location of the target 50 based the result of detection D1 by the detection system 3. This enables reducing, even if a delay is caused by, for example, processing inside the detection system 3 or transmission of the result of detection D1 from the detection system 3 to the rendering system 1, the chances of the display location of the marker M1 finally displayed being affected by these delays. In particular, the correction unit 12 makes the correction based on the traveling condition of the moving vehicle 6 equipped with the detection system 3. This enables reducing the shift of the display location due to the movement of the detection system 3 itself during the delay period described above.

Also, a rendering system 1 according to this embodiment includes the rendering unit 11 and an interpolation unit 13. The rendering unit 11 renders, based on the result of detection D1 by the detection system 3, the marker M1, corresponding to the location of the target 50, at least in every first cycle T1 (see FIG. 7). In this embodiment, the detection system 3 detects the target 50 and outputs the result of detection D1 in every first cycle T1. The interpolation unit 13 makes, whenever the rendering unit 11 updates the marker M1 in every second cycle T2 (see FIG. 7), which is shorter than the first cycle T1, interpolation based on interpolation data D3 to obtain an interpolated marker M1 (see FIG. 7) as the marker M1 that has been updated.

According to this configuration, in a situation where the second cycle T2 in which the rendering unit 11 updates the marker M1 is shorter than the first cycle T1 in which the detection system 3 outputs the result of detection D1, the updated marker M1 (interpolated marker M1) is obtained through interpolation based on the interpolation data D3. This enables, even during, for example, the first cycle T1 between a point in time when the detection system 3 outputs the result of detection D1 and a point in time when the detection system 3 outputs the result of detection D1 next time, changing the marker M1 every time the marker M1 is updated, thus allowing the marker M1 to move relatively smoothly. Consequently, this reduces the chances of the marker M1 exhibiting unnatural behavior.

(2) Details

Next, the rendering system 1, display system 10, and moving vehicle 6 according to this embodiment will be described in further detail with reference to FIGS. 1-10.

(2.1) Premise

As used herein, the "moving vehicle" includes the display system 10 and the moving vehicle body 61 as described above. In this embodiment, the moving vehicle 6 is supposed to be, for example, an automobile to be driven by a human (i.e., a passenger car).

As used herein, the "marker" refers to an image displayed by the display device 2 in a form visually recognizable for the user 62 (see FIG. 2). The marker M1 may be, for example, a figure, a sign, a character, a numeral, a pattern, a photograph, or a combination thereof. Examples of this type of marker M1 include a moving picture (moving image) and a still picture (still image). The moving picture includes a group of still pictures obtained by stop-motion capturing, for example. In this embodiment, the marker M1 rendered by the rendering system 1 is supposed to be a moving picture to be updated (i.e., rewritten) at a predetermined refresh rate. In addition, in this embodiment, the marker M1 rendered by the rendering system 1 is supposed to be, for example, a three-dimensional image to be displayed on a three-dimensional space defined by three orthogonal axes, namely, the X-, Y- and Z-axes. That is to say, the marker M1 rendered by the rendering system 1 is a three-dimensional image having not only information about vertical and horizontal locations but also information about its location in a depth direction according to the distance from the detection system 3 to the target 50.

As used herein, the "user" refers to a person who is looking at the marker M1 rendered by the rendering system 1, i.e., the marker M1 displayed by the display system 10. In this embodiment, the user 62 is supposed to be the driver of an automobile as an exemplary moving vehicle 6 as an example.

As used herein, the "target" refers to any moving or non-moving target to be detected by the detection system 3. Examples of the target include humans or other creatures such as small animals, other moving vehicles, and structures such as walls, guardrails, and traffic lights. Examples of the humans as used herein include a pedestrian, a runner, a person who is stopping to wait, a person who is sitting, a person who is lying on the ground, and a person who is riding a bicycle. Furthermore, examples of the target 50 include not only these three-dimensional moving or non-moving targets but also two-dimensional moving or non-moving targets such as white lines and characters drawn on the roads. In this embodiment, the target 50 is supposed to be, for example, a moving or non-moving target which is located around the moving vehicle 6 (in particular, a moving or non-moving target located in front of the moving vehicle 6 in the traveling direction) and which should attract the attention of the user 62 who is driving the moving vehicle 6. Specifically, in the following description, the target 50 is supposed to be a pedestrian 51 who is walking in front of the moving vehicle 6 in the traveling direction, except in the examples illustrated in FIGS. 8 and 9, in which the target 50 is the traffic light 55 located in front of the moving vehicle 6 in the traveling direction.

As used herein, the "traveling condition" refers to a condition of a mover that is traveling. The traveling condition of the mover may be represented by at least one of various parameters such as a moving velocity, the magnitude of movement (including the distance traveled and the angle of movement), a traveling direction, acceleration, the duration of traveling, and the orientation during traveling. For example, when it comes to the traveling condition of a moving vehicle 6, the traveling condition includes the moving velocity, the magnitude of movement, the traveling direction, or the acceleration of the moving vehicle 6. Such a traveling condition may be detected by any of various onboard sensors installed in the moving vehicle body 61 for detecting, for example, a vehicle velocity pulse, the acceleration applied to the moving vehicle body 61, the accelerator pedal angle (indicating how deep the accelerator pedal is depressed), how deep the brake pedal is depressed, or the steering angle. Alternatively, the traveling condition of the moving vehicle 6 may also be detected based on the moving vehicle body's 61 location information to be collected by the global positioning system (GPS), for example.

Also, the "first cycle" as used herein refers to a cycle in which the detection system 3 outputs the result of detection D1. In other words, the detection system 3 outputs the result of detection D1 in every first cycle T1. Meanwhile, the "second cycle" as used herein refers to a cycle in which the rendering unit 11 updates the marker M1. In other words, the rendering unit 11 updates (i.e., rewrites) the marker M1 in every second cycle T2. Comparing the first cycle T1 and the second cycle T2 to each other, the second cycle T2 is shorter than the first cycle T1 and the first cycle T1 is longer than the second cycle T2 (i.e., T1>T2). That is to say, the cycle in which the rendering unit 11 updates the marker M1 (i.e., the second cycle T2) is shorter than the cycle in which the detection system 3 outputs the result of detection D1 (i.e., the first cycle T1). Thus, while the detection system 3 outputs the result of detection D1 once, the rendering unit 11 updates the marker M1 once or more. In this embodiment, the first cycle T1 is 600 ms and the second cycle T2 is 100 ms, for example.

(2.2) Overall Configuration

Next, an overall configuration for the rendering system 1, display system 10, and moving vehicle 6 according to this embodiment will be described.

As shown in FIG. 1, the display device 2 and the detection system 3 are connected to the rendering system 1. The display device 2 and the detection system 3 are installed, along with the rendering system 1, in the moving vehicle body 61 of the moving vehicle 6. In other words, the moving vehicle 6 according to this embodiment includes not only the rendering system 1 and the moving vehicle body 61 but also the display device 2 and the detection system 3 as well.

In addition, an electronic control unit (ECU) 4 of the moving vehicle body 61 is further connected to the rendering system 1. In this embodiment, the ECU 4 is supposed to be not counted among the constituent elements of the rendering system 1. Alternatively, the ECU 4 may be counted among the constituent elements of the rendering system 1.

The display device 2 displays the marker M1 rendered by the rendering system 1. In this embodiment, image data D4 is supplied from the rendering system 1 to the display device 2. The image data D4 includes the marker M1 rendered by the rendering system 1. Thus, the display device 2 displays the marker M1 rendered by the rendering system 1 by displaying the image data D4 thereon.

In this embodiment, the display device 2 may be, for example, a head-up display (HUD). This display device 2 projects the marker M1 onto a windshield 611 (see FIG. 2) of the moving vehicle body 61 from below the windshield 611, thereby making the user 62 (e.g., the driver of the moving vehicle 6) visually recognize the marker M1 reflected from the windshield 611.

Such a display device 2 makes the user 62 sense a virtual image as if he or she were viewing, through the windshield 611, the virtual image projected onto the space in front of (and outside of) the moving vehicle 6. As used herein, the "virtual image" refers to an image formed by a ray of the light emitted from the display device 2 and diverging from a reflector such as the windshield 611 as if there actually was an object in the space. This allows the user 62 who is driving the moving vehicle 6 to visually recognize the marker M1 as a virtual image projected by the display device 2 as an image superimposed on the real space in front of the moving vehicle 6.

In particular, in this embodiment, the marker M1 is a three-dimensional image having location information in a depth direction representing the distance from the detection system 3 to the target 50. This allows the display device 2 to project the marker M1 to be visually recognized with a sense of depth onto a road surface 54 in front of the moving vehicle 6.

Specifically, as shown in FIG. 2, the display device 2 displays the marker M1 at a location around the target 50 (e.g., a pedestrian 51 in this example) detected by the detection system 3 within the view of the user 62 (the driver of the moving vehicle 6). Thus, to the user's 62 eyes, the marker M1 is displayed as a stereoscopic superimposed image around the target 50, thus arousing his or her attention to the target 50. That is to say, an augmented reality (AR) display, in which the marker M1 displayed by the display device 2 is synthesized on the user's 62 view of the real space in front of him or her, is realized.

In addition, the display device 2 is integrated with the rendering system 1. The rendering system 1 and the display device 2 that form the display system 10 are housed in a single housing. The display system 10 (including the rendering system 1 and the display device 2) is installed in a dashboard 612 of the moving vehicle body 61.

The detection system 3 is installed in the (moving vehicle body 61 of the) moving vehicle 6 as described above. As the detection system 3, a detection system such as an advanced driver assistance system (ADAS) of the moving vehicle 6 or an autonomous driving system may be used, for example. The ADAS or autonomous driving technology enables the detection system 3 to detect the presence of the target 50 around the moving vehicle 6.

The detection system 3 includes a sensing means such as a camera 31 (see FIG. 4), a sonar sensor, a radar, or a light detection and ranging (LiDAR) sensor. The detection system 3 detects, using any of these sensing means, the target 50 present around the moving vehicle 6 (in particular, in front of the moving vehicle 6 in the traveling direction). The detection system 3 outputs the result of detection D1 to the rendering system 1 in every first cycle T1.

Figure 4:
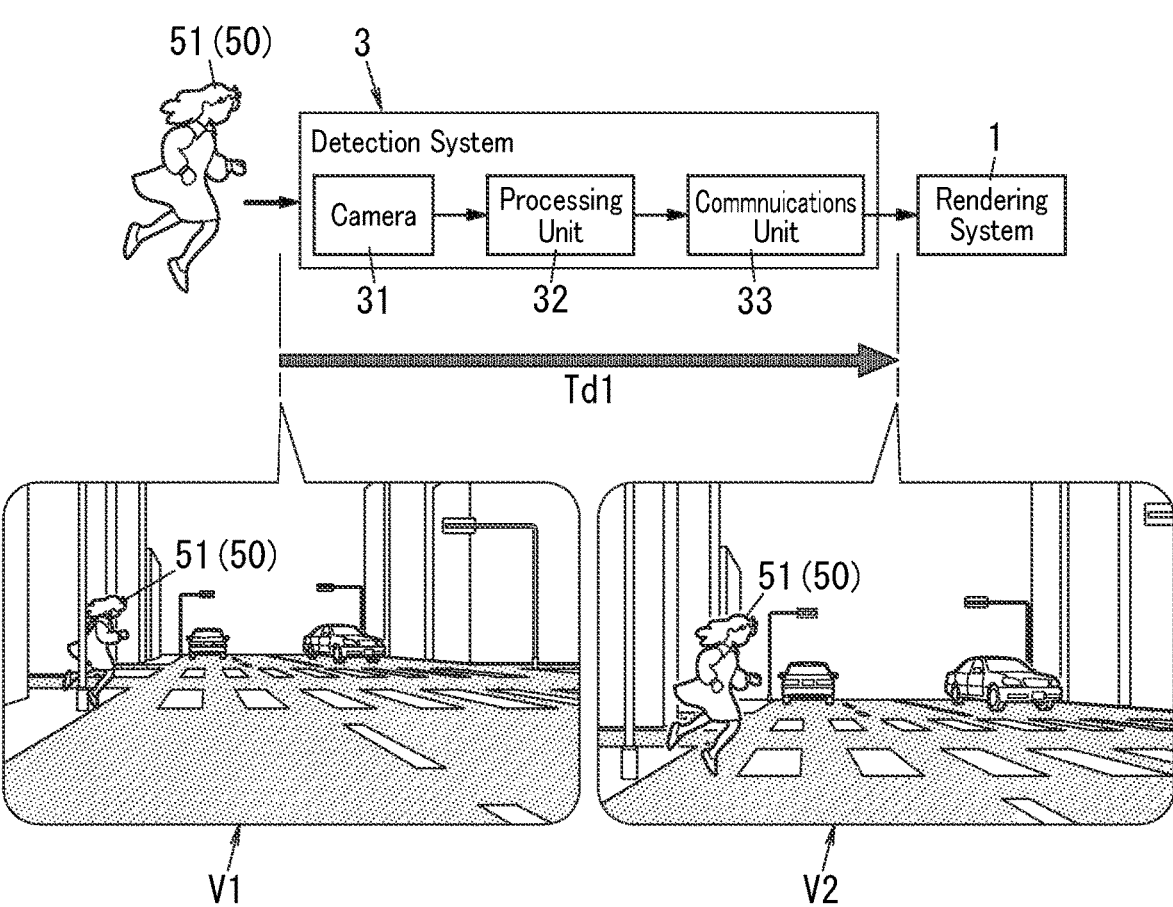
FIG. 4 is a schematic representation conceptually illustrating how a delay is caused by the rendering system.

In this embodiment, the detection system 3 includes not only the sensing means such as the camera 31 but also a processing unit 32 and a communications unit 33 as well as shown in FIG. 4, for example. The processing unit 32 performs appropriate signal processing on the output signal of the camera 31, for example, to detect the target 50. The communications unit 33 communicates with the rendering system 1 to output (transmit) the result of detection D1 to the rendering system 1.

The result of detection D1 by the detection system 3 includes information about the presence or absence of the target 50 in a monitoring region (i.e., a predetermined region in front of the moving vehicle 6 in the traveling direction). If the target 50 is present there, the result of detection D1 by the detection system 3 further includes information about the relative location of the target 50 as viewed from the detection system 3 (i.e., as viewed from the moving vehicle 6) and information about the attributes of the target 50.

As used herein, the "relative location" refers to the location of a representative point P2 (see FIG. 5) of the target 50 as viewed from a representative point P1 (see FIG. 5) of the detection system 3 (of the moving vehicle 6) on the supposition that the representative point P1 is a reference point. In particular, in this embodiment, the "relative location" is represented by coordinates in an X-Y coordinate system, of which the origin is defined by the representative point P1 in plan view (i.e., in a bird-eye view). In this case, the X-axis is an axis extending laterally (i.e., in the rightward/leftward direction) with respect to the moving vehicle 6 and the Y-axis is an axis extending vertically (i.e., in the forward/backward direction) with respect to the moving vehicle 6. Detecting such a relative location enables determining, for example, the distance from the detection system 3 (the moving vehicle 6) to the target 50.

Also, as used herein, the "attribute" means, for example, information indicating whether the target 50 is moving or not and information indicating, if the target 50 is moving, its traveling condition (such as its moving velocity, magnitude of movement, traveling direction, acceleration, duration of traveling, and orientation during traveling). In addition, in this embodiment, the attribute of the target 50 further includes the type of the target 50, i.e., whether the target 50 is human or not, whether the target 50 is a mover (such as a person, an automobile or a bicycle) or a stationary object, and what the stationary object is (e.g., a roadside tree, a traffic light, or a guardrail). The attribute of the target 50 further includes the size, color, or any other parameter of the target 50. Furthermore, if the target 50 is a human, then the attribute of the target 50 also includes his or her gender, height, shape, or age group, for example.

The ECU 4 outputs vehicle information D5 to the rendering system 1. The vehicle information D5 is information representing local conditions of the moving vehicle 6 and may be detected by sensors installed in the moving vehicle body 61. Specific examples of the vehicle information D5 include a vehicle velocity pulse (representing the moving velocity of the moving vehicle body 61), the acceleration applied to the moving vehicle body 61, the accelerator pedal angle (indicating how deep the accelerator pedal is depressed), how deep the brake pedal is depressed, and the steering angle. That is to say, the vehicle information D5 includes information that enables determining the traveling condition of the moving vehicle 6.

Furthermore, the user's pulse, facial expression, gaze, and other parameters to be detected by a drive monitor and information unique to the moving vehicle body 61 such as the vehicle width, vehicle height, total length, and eye point may also be included in the vehicle information D5. Optionally, the vehicle information D5 may further include information that may be detected using a global positioning system (GPS), for example, such as location information based on the current location of the moving vehicle 6 (e.g., information about the road at the current location of the moving vehicle 6). Specific examples of the location information include information about the number of lanes of the road on which the user's vehicle is currently located, whether the vehicle is currently located at a crossing or not, whether the vehicle is currently located at a T-junction or not, whether the road is a one-way street or not, the width of the roadway, whether there is any sidewalk, the grade of the road, and the curvature of the curve.

Connecting the display device 2, the detection system 3, and the ECU 4 to the rendering system 1 allows the rendering system 1 to display a marker M1 such as the one shown in FIG. 2. That is to say, the rendering system 1 renders, based on at least the result of detection D1 by the detection system 3, the marker M1 corresponding to the location of the target 50. In this embodiment, the rendering system 1 acquires the result of detection D1 and the vehicle information D5 from the detection system 3 and the ECU 4, respectively, and renders the marker M1 based on these pieces of information. The rendering system 1 generates image data D4 to have the marker M1 thus rendered displayed on the display device 2 and outputs the image data D4 to the display device 2, thereby making the display device 2 display the marker M1 thereon.

FIG. 2 illustrates the view of the user 62 who is driving the moving vehicle 6 in the conditions shown in FIG. 3. Note that the reference signs, the leader lines, and other indicators are shown in FIG. 2 just for the purpose of description and are not actually visually recognized by the user 62. In this example, the pedestrian 51 to be detected as the target 50 by the detection system 3 is currently located in front of the moving vehicle 6 and now crossing a crosswalk 541 provided on the surface 54 of the road along which the moving vehicle 6 is traveling as shown in FIGS. 2 and 3.

In the example illustrated in FIG. 2, a marker M1 corresponding to the location of the pedestrian 51 as the target 50 is rendered. Specifically, at the feet of the pedestrian 51 as the target 50, an annular marker M1 is rendered to surround the pedestrian 51. That is to say, the marker M1 is displayed, in plan view (bird's-eye view), at a location corresponding to the pedestrian 51 as the target 50 (e.g., at the same location as the pedestrian 51 as the target 50 in this example) to be superimposed on the road surface 54. Thus, to the user's 62 eyes, the target 50 looks as if the pedestrian 51 (target 50) was standing inside the annular marker M1.

In this embodiment, it is not until the target 50 is detected by the detection system 3 that the rendering system 1 renders the marker M1. In other words, if the result of detection D1 by the detection system 3 indicates that there are no targets, the rendering system 1 renders no markers M1. On the other hand, if the result of detection D1 by the detection system 3 indicates that there is a target, then the rendering system 1 renders a marker M1. Thus, in a state where no targets 50 are present in the monitoring region for the detection system 3 (i.e., a predetermined region in front of the moving vehicle 6 in the traveling direction), the rendering system 1 renders no markers M1. Consequently, no markers M1 are displayed on the display device 2.

Also, if the target 50 moves relatively as viewed from the moving vehicle 6, then the rendering system 1 renders the marker M1 while changing the rendering location of the marker M1 to track the target 50 with the marker M1. In this case, the relative movement of the target 50 with respect to the moving vehicle 6 may be caused when at least one of the moving vehicle 6 or the target 50 moves. That is to say, even in a situation where the moving vehicle 6 is currently present at a fixed location, if the target 50 is a moving target such as the pedestrian 51, then the target 50 still moves relatively as viewed from the moving vehicle 6. Likewise, even in a situation where the target 50 is present at a fixed location, as the moving vehicle 6 moves, the target 50 still moves relatively as viewed from the moving vehicle 6. In either case, the rendering system 1 renders the marker M1 while changing the rendering location of the marker M1 to track the target 50 with the marker M1 as shown in FIG. 2.

Note that the marker M1 rendered by the rendering system 1 does not have to have the shape shown in FIG. 2. Alternatively, the marker M1 may also be rendered as, for example, a frame that surrounds the target 50 in front view. Still alternatively, the marker M1 may also be, for example, a mere figure, an arrow or balloon pointing at the target 50, or an icon (iconography) simulating the target 50. Furthermore, the marker M1 only needs to be displayed at a location corresponding to the target 50. For example, the marker M1 may be displayed before the target 50 to overlap with the target 50. Alternatively, the marker M1 may also be displayed over or beside the target 50. Optionally, the marker M1 may also be a marker M1 with motion (i.e., a marker M1 that changes), which may flicker, change its color or shape, or move (e.g., rotate), for example, with the passage of time. In that case, the motion of the marker M1 is preferably synchronized with the movement of the target 50. For example, the marker M1 may bounce at the same pace as the pedestrian 51 as the target 50.

(2.3) Configuration for Rendering System

Next, a configuration for the rendering system 1 according to this embodiment will be described in further detail.

In this embodiment, the rendering system 1 includes not only the rendering unit 11, the correction unit 12, and the interpolation unit 13 but also a correction adjustment unit 121, an interpolation adjustment unit 131, an input information processing unit 14, a prediction unit 15, a storage unit 16, a sensor 17, and a filter 18 as well as shown in FIG. 1.

In this embodiment, the rendering system 1 may include, as a major constituent element, a computer system (which may also be a server or a cloud computing system) including one or more processors and one or more memories. The processor performs the functions of the rendering system 1 by executing a program stored in the memory. The program may be stored in advance in the memory. The program may also be distributed after having been stored in a non-transitory storage medium such as a memory card or downloaded via a telecommunications line. In other words, the program is designed to cause the one or more processors to serve as the rendering system 1. Among the constituent elements of the rendering system 1, the functions of at least the rendering unit 11, the correction unit 12, the interpolation unit 13, the correction adjustment unit 121, the interpolation adjustment unit 131, the input information processing unit 14, and the prediction unit 15 may be performed by the computer system.

The rendering unit 11 renders, based on the result of detection D1 by the detection system 3, the marker M1 corresponding to the location of the target 50. In this embodiment, the rendering unit 11 renders, based on the result of detection D1 by the detection system 3, the marker M1 corresponding to the location of the target 50 at least in every first cycle T1. As described above, the first cycle T1 is a cycle in which the detection system 3 outputs the result of detection D1. Furthermore, the rendering unit 11 updates the marker M1 in every second cycle T2, which is shorter than the first cycle T1. That is to say, the rendering unit 11 renders, based on the result of detection D1 by the detection system 3, the marker M1 at least in every first cycle T1 and updates the marker M1 in every second cycle T2 shorter than the first cycle T1.

The rendering unit 11 may be implemented as, for example, a graphics processing unit (GPU) and may perform rendering processing compliant with, for example, the Open Graphics Library (OpenGL) standard. The rendering unit 11 stores the marker M1 thus rendered in a frame memory. As used herein, the "frame memory" refers to a memory (frame buffer) for storing the display data corresponding to one frame to be displayed on the display device 2. The frame memory may be either a dedicated memory or an area that forms part of the memory of a computer system, whichever is appropriate.

The correction unit 12 corrects, based on correction data D2, the location of the target 50 in accordance with the result of detection D1 by the detection system 3 and thereby determines a location of the marker M1 to be rendered by the rendering unit 11. In this case, the correction data D2 is obtained based on at least traveling information about the traveling condition of the moving vehicle 6. That is to say, the correction unit 12 corrects, based on the correction data D2 that reflects at least the traveling condition of the moving vehicle 6, the location of the marker M1 to be rendered by the rendering unit 11. Thus, the rendering unit 11 determines the rendering location of the marker M1 not directly based on the location of the target 50 in accordance with the result of detection D1 by the detection system 3 but indirectly based on the location obtained by making the correction unit 12 correct the former location.

In the following description, the rendering location of the marker M1 that has not been subjected to the correction by the correction unit 12 yet will be hereinafter referred to as a "location yet to be corrected" and the rendering location of the marker M1 that has been subjected to the correction will be hereinafter referred to as a "corrected location." According to this nomenclature, the location yet to be corrected is a location determined in accordance with the result of detection D1 by the detection system 3 and the corrected location is a location to be determined by subjecting the location yet to be corrected to correction based on the correction data D2. The marker M1 is rendered by the rendering unit 11 at the corrected location, not at the location yet to be corrected.

In this embodiment, the correction unit 12 acquires the location of the target 50 in accordance with the result of detection D1 by the detection system 3 as the location yet to be corrected from the input information processing unit 14 and also acquires the correction data D2 from the prediction unit 15. The correction unit 12 corrects the rendering location based on these pieces of information (namely, the location yet to be corrected and the correction data D2) and outputs the corrected location to the rendering unit 11.

In addition, the correction unit 12 also determines the contents of the marker M1 based on the correction data D2. That is to say, in this embodiment, the correction unit 12 corrects, based on the correction data D2, not only the location of the marker M1 to be rendered by the rendering unit 11 but also the contents of the marker M1 to be rendered by the rendering unit 11 as well. As used herein, the "contents of the marker M1" refers to the content of a figure, a sign, a character, a numeral, a pattern, or a photograph, or a combination thereof as the marker M1. For example, if the marker M1 includes a character, the character included in the marker M1 changes when the correction unit 12 corrects the contents of the marker M1. The contents of the marker M1 may further include the specific implementation of the marker M1 (which may be a ring, a frame, a figure, an arrow, a balloon, or an icon, for example).

The operation of the correction unit 12 will be described in detail later in the "(2.4.1) Correction operation" section.

The interpolation unit 13 makes, whenever the rendering unit 11 updates the marker M1 in every second cycle T2, interpolation based on interpolation data D3 to obtain an interpolated marker M11 as the marker M1 that has been updated. That is to say, the interpolation unit 13 obtains, based on at least the interpolation data D3, a marker M1 that has been updated by the rendering unit 11 (i.e., the interpolated marker M11). In this embodiment, the interpolation data D3 is data to be obtained based on at least traveling information about the traveling condition of the moving vehicle 6. This allows, even during the first cycle T1 between a point in time when the detection system 3 outputs the result of detection D1 once and a point in time when the detection system 3 outputs the result of detection D1 next time, the rendering unit 11 to render a new marker M1 (interpolated marker M11) in every second cycle T2.

In the following description, the rendering location of the marker M1 that has not been subjected to the interpolation by the interpolation unit 13 yet will be hereinafter referred to as a "reference location" and the rendering location of the marker M1 that has been subjected to the interpolation (interpolated marker M11) will be hereinafter referred to as an "interpolated location." According to this nomenclature, the reference location is a location determined in accordance with the result of detection D1 by the detection system 3 and the interpolated location is a location to be determined by subjecting the reference location to interpolation based on the interpolation data D3. The interpolated marker M11 is rendered by the rendering unit 11 at the interpolated location, not at the reference location. Nevertheless, since the correction unit 12 is provided in this embodiment to precede the rendering unit 11, the reference location is not the location yet to be corrected but the corrected location that has been subjected to the correction by the correction unit 12.

In this embodiment, the interpolation unit 13 acquires the corrected location as the reference location from the correction unit 12 and acquires the interpolation data D3 from the prediction unit 15. The interpolation unit 13 determines the interpolated location based on these pieces of information (namely, the reference location and the interpolation data D3) and outputs the interpolated location to the rendering unit 11. This allows the rendering unit 11 to render the marker M1 (interpolated marker M11) at the interpolated location and allows the interpolation unit 13 to obtain the interpolated marker M11. That is to say, according to this embodiment, making the interpolation unit 13 obtain the interpolated marker M11 through interpolation changes the rendering location of the marker M1 (interpolated marker M11) from the reference location to the interpolated location. Thus, according to this embodiment, the interpolation unit 13 determines the rendering location of the interpolated marker M11 based on the interpolation data D3.

In addition, the interpolation unit 13 also determines the contents of the interpolated marker M11 based on the interpolation data D3. That is to say, in this embodiment, the interpolation unit 13 obtains, through interpolation based on the interpolation data D3, not only the location of the interpolated marker M11 to be rendered by the rendering unit 11 but also the contents of the interpolated marker M11 to be rendered by the rendering unit 11 as well. As used herein, the "contents of the interpolated marker M11" refers to the content of a figure, a sign, a character, a numeral, a pattern, or a photograph, or a combination thereof as the interpolated marker M11. For example, if the interpolated marker M11 includes a character, the character included in the interpolated marker M11 changes when the interpolation unit 13 modifies the contents of the interpolated marker M11. The contents of the interpolated marker M11 may further include the specific implementation of the interpolated marker M11 (which may be a ring, a frame, a figure, an arrow, a balloon, or an icon, for example).

The operation of the interpolation unit 13 will be described in detail later in the "(2.4.2) Interpolation operation" section.

The correction adjustment unit 121 adjusts the strength of the correction to be made by the correction unit 12. As used herein, the "strength of correction" refers to the degree to which the correction made by the correction unit 12 is effective, i.e., the degree of effectiveness of the correction. The higher the strength is, the more effective the correction made by the correction unit 12 will be. For example, as the strength of correction increases, the upper limit value of the magnitude of displacement from the location yet to be corrected to the corrected location increases. Also, in a situation where the strength of correction is adjustable between zero and one, if the strength of correction is zero, the correction function of the correction unit 12 is disabled. On the other hand, if the strength of correction is one, the correction function of the correction unit 12 is enabled. The correction adjustment unit 121 may select one of multiple stages of the strength or may change the strength continuously, whichever is appropriate.

The interpolation adjustment unit 131 adjusts the strength of the interpolation to be made by the interpolation unit 13. As used herein, the "strength of interpolation" refers to the degree to which the interpolation made by the interpolation unit 13 is effective, i.e., the degree of effectiveness of the interpolation. The higher the strength is, the more effective the interpolation made by the interpolation unit 13 will be. For example, as the strength of interpolation increases, the upper limit value of the magnitude of displacement from the reference location to the interpolated location increases. Also, in a situation where the strength of interpolation is adjustable between zero and one, if the strength of interpolation is zero, the interpolation function of the interpolation unit 13 is disabled. On the other hand, if the strength of interpolation is one, the interpolation function of the interpolation unit 13 is enabled. The interpolation adjustment unit 131 may select one of multiple stages of the strength or may change the strength continuously, whichever is appropriate.

The input information processing unit 14 is an input interface, through which the result of detection D1 and the vehicle information D5 are entered. The input information processing unit 14 acquires the result of detection D1 from the detection system 3 in every first cycle T1. The input information processing unit 14 acquires the vehicle information D5 from the ECU 4 as needed. In this embodiment, the cycle in which the input information processing unit 14 acquires the vehicle information D5 is supposed to be sufficiently shorter than the first cycle T1. The communication between the input information processing unit 14 and the (communications unit 33 of the) detection system 3 or the ECU 4 may be established in accordance with a communications protocol compliant with, for example, the Ethernet® or Controller Area Network (CAN) standard. The input information processing unit 14 outputs the result of detection D1 and the vehicle information D5 to each of the correction unit 12, the prediction unit 15, and the storage unit 16.

The prediction unit 15 generates the correction data D2 and the interpolation data D3. As described above, the correction data D2 is obtained based on at least traveling information about the traveling condition of the moving vehicle 6. Likewise, the interpolation data D3 is obtained based on at least traveling information about the traveling condition of the moving vehicle 6. In this case, the traveling information is predicted from at least the past behavior of the moving vehicle 6. As used herein, examples of the "behavior" include the orientation, the moving velocity, the magnitude of movement (including the distance traveled and the angle of movement), the traveling direction, the acceleration, the duration of traveling, the orientation during traveling, and the trajectory. That is to say, the prediction unit 15 predicts, based on the past behavior of the moving vehicle 6, traveling information about the current traveling condition of the moving vehicle 6 and obtains, based on this traveling information, the correction data D2 and the interpolation data D3.

Also, in this embodiment, the correction data D2 is obtained based on not only the traveling information but also target information about the traveling condition of the target 50 as well. Likewise, the interpolation data D3 is obtained based on at least target information about the traveling condition of the target 50. That is to say, in this embodiment, each of the correction data D2 and the interpolation data D3 is data obtained based on both the traveling information about the traveling condition of the moving vehicle 6 and the target information about the traveling condition of the target 50. In this case, the target information is predicted from at least the past behavior of the target 50. That is to say, the prediction unit 15 predicts, based on the past behavior of the target 50, target information about the current traveling condition of the target 50 and obtains, based on this target information, the correction data D2 and the interpolation data D3.

The operation of the prediction unit 15 will be described in detail later in the "(2.4.1) Correction operation" section or the "(2.4.2) Interpolation operation" section.

The storage unit 16 includes a programmable nonvolatile memory such as an electrically erasable programmable read-only memory (EEPROM). The storage unit 16 memorizes at least the past behavior of the moving vehicle 6 and the past behavior of the target 50. Thus, the prediction unit 15 reads out the past behavior of the moving vehicle 6 and the past behavior of the target 50 from the storage unit 16 and uses the behavior thus read for predicting the traveling information and the target information.

The sensor 17 is installed in the moving vehicle body 61 and used to detect the traveling condition of the moving vehicle 6. In this embodiment, the sensor 17 may be, for example, a gyrosensor (angular velocity sensor) for detecting an angular velocity. In this case, the sensor 17 uses, as respective detection axes, an X-axis (corresponding to the rightward/leftward direction with respect to the moving vehicle 6), a Y-axis (corresponding to the forward/backward direction with respect to the moving vehicle 6), and a Z-axis (vertical direction) which are perpendicular to each other and detects the angular velocity around each of these detection axes. That is to say, the sensor 17 may detect the angular velocity in each of the pitching direction, the rolling direction, and yawing direction defined with respect to the moving vehicle 6.

The filter 18 is provided to follow the sensor 17 and subjects the output signal of the sensor 17 to appropriate filtering processing. The output signal of the sensor 17, which has been filtered by the filter 18, is supplied to the prediction unit 15.

(2.4) Operation

Next, it will be described how the rendering system 1 according to this embodiment operates. That is to say, a rendering method according to this embodiment will be described.

In the following description, it will be described how the rendering system 1 operates in, for example, a "first scene" in which the detection system 3 detects a pedestrian 51 as the target 50 and a "second scene" in which the detection system 3 detects a traffic light 55 as the target 50. The following description will be basically focused on the operation of the rendering system 1 in the first scene. The operation of the rendering system 1 in the second scene will be described later in the "(2.4.3) Second scene" section.

In the first scene, a pedestrian 51 who is crossing a crosswalk 541 provided on the road surface 54 is supposed to be present in front of the moving vehicle 6 that is moving (traveling) as shown in FIGS. 2 and 3. In the first scene, not only the pedestrian 51 but also moving or non-moving targets such as other vehicles 52, 53 that are currently at a stop and a traffic light 55 are present in front of the moving vehicle 6. Nevertheless, in the first scene, only the pedestrian 51 is supposed to be detected as the target 50 by the detection system 3.

Figure 8:
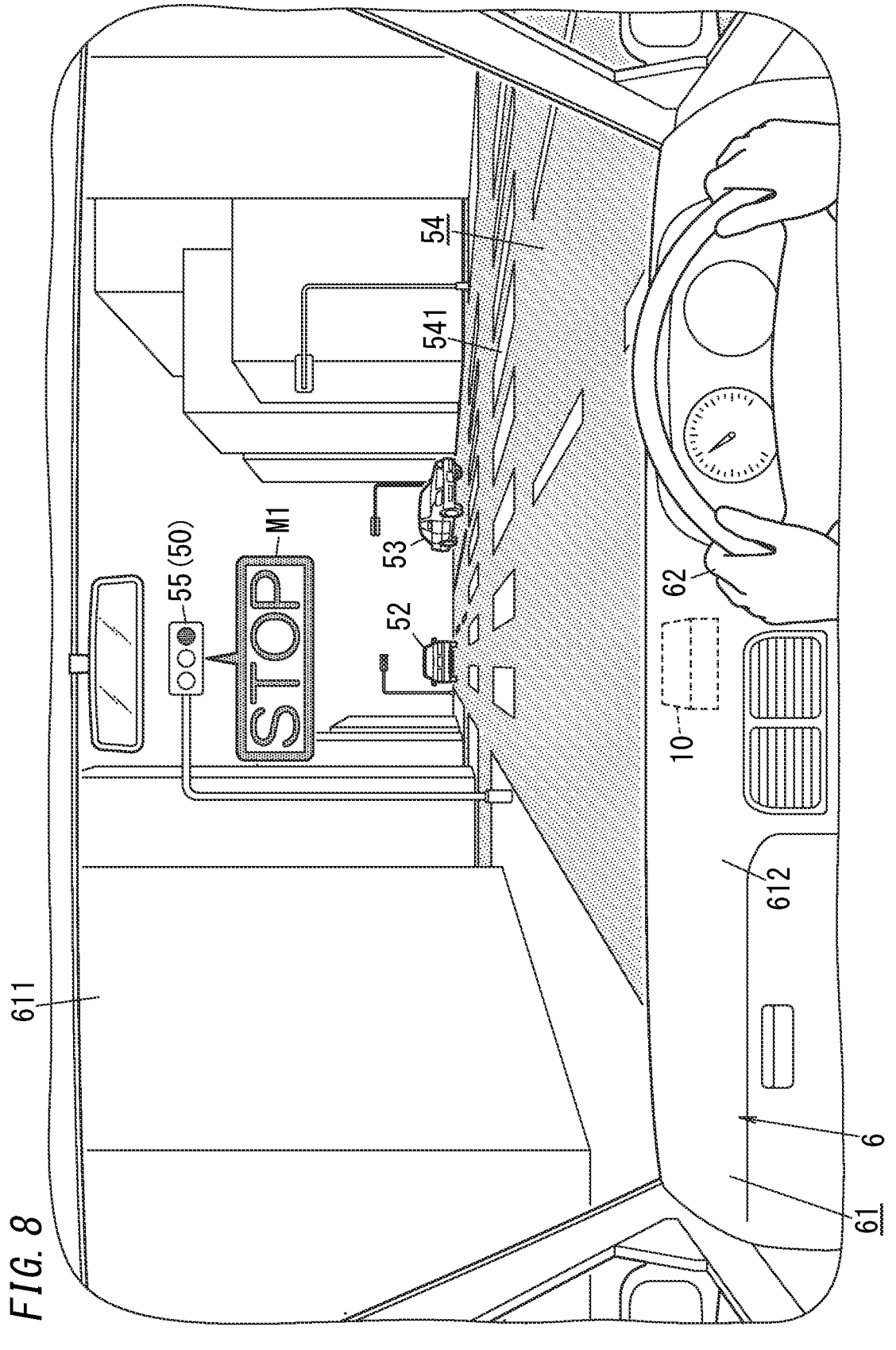
FIG. 8 illustrates the user's view to describe an exemplary operation of the display system in a second scene.
Figure 9:
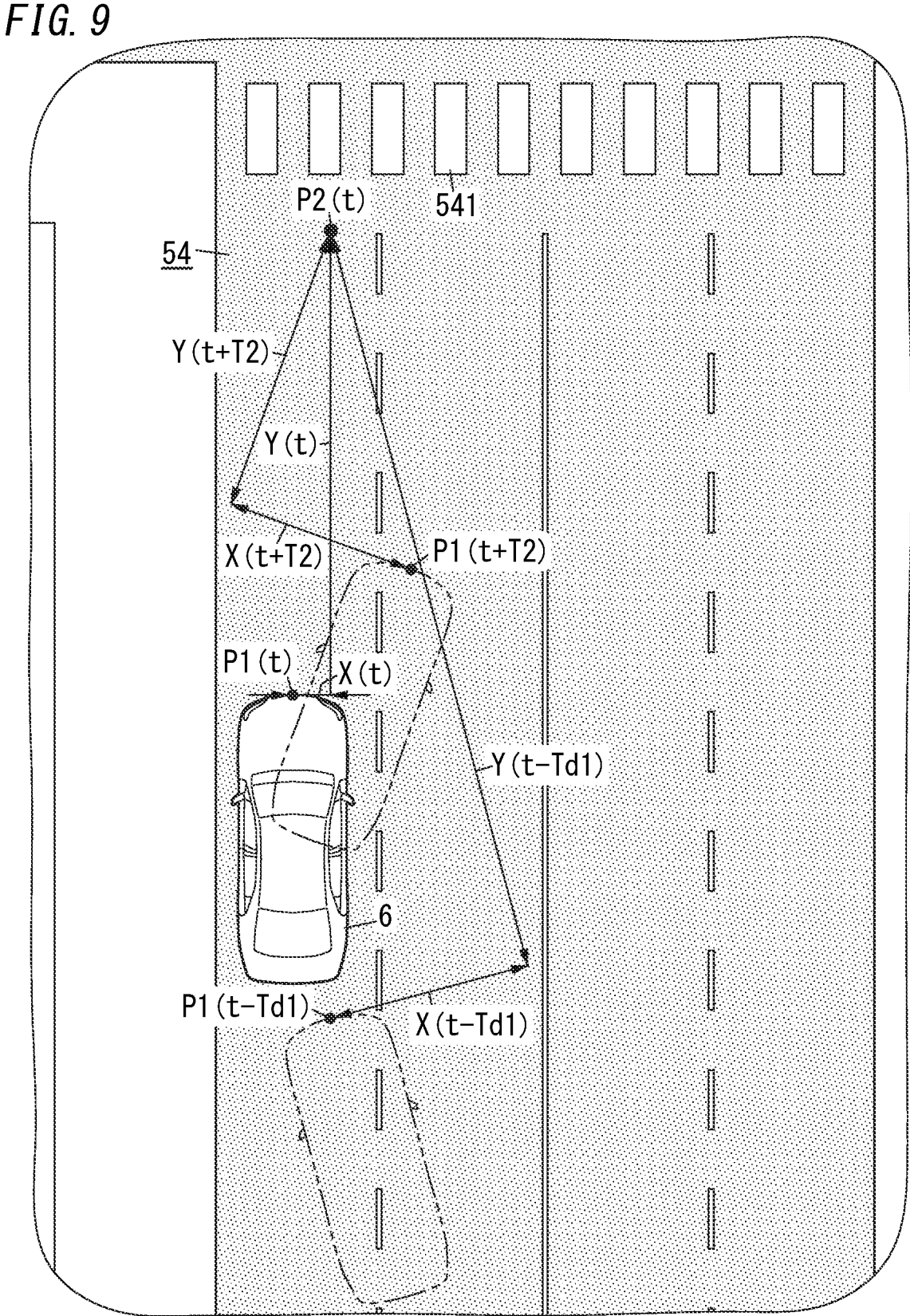
FIG. 9 is a conceptual diagram illustrating the second scene to describe the exemplary operation of the display system.

In the second scene, on the other hand, no pedestrians are supposed to be present in front of the moving vehicle 6 that is moving (traveling) as shown in FIGS. 8 and 9. In the second scene, moving or non-moving targets such as other vehicles 52, 53 that are currently at a stop and a traffic light 55 are present in front of the moving vehicle 6. In the second scene, only the traffic light 55 is supposed to be detected as the target 50 by the detection system 3.

(2.4.1) Correction Operation

First, the correction operation to be performed mainly by the correction unit 12 will be described with reference to FIGS. 4-6B. FIGS. 6A and 6B each illustrate a part of the user's 62 view including the marker M1 displayed by the display system 10. In FIG. 6A, the marker M1 is supposed to be rendered at the located yet to be corrected (i.e., the rendering location of the marker M1 that has not been subjected to correction by the correction unit 12). In FIG. 6B, the marker M1 is supposed to be rendered at the corrected location (i.e., the rendering location of the marker M1 that has been subjected to the correction by the correction unit 12). Note that the reference signs, the leader lines, and other indicators are shown in FIGS. 6A and 6B just for the purpose of description and are not actually visually recognized by the user 62.

FIG. 4 conceptually illustrates how a delay is caused between a point in time when the target 50 is detected by the detection system 3 and a point in time when the marker M1 is rendered by the rendering unit 11. That is to say, as shown in FIG. 4, a delay may be caused due to any of various factors in the interval between a point in time when an event that is the appearance of the target 50 (pedestrian 51) has occurred and a point in time when the rendering unit 11 renders the marker M1 based on the result of detection D1 by the detection system 3 about this event. For example, in the detection system 3, a delay (acquisition delay) on the order of a few ten ms could be caused between a point in time when capturing (exposure) is done by the camera 31 and a point in time when the camera 31 output the image thus captured. In addition, another delay (transmission delay) on the order of a few ten to several hundred ms could also be caused when the result of detection D1 by the detection system 3 is transmitted from the detection system 3 to the rendering system 1. Furthermore, an interframe delay, for example, could also be caused due to the frame rate of the camera 31, for example.

Due to these delays, there is a delay period Td1 between a point in time when the target 50 is detected by the detection system 3 and a point in time when the marker M1 is rendered by the rendering unit 11 in the rendering system 1. In this embodiment, the starting point of the delay period Td1 is supposed to be the point in time when the target 50 is detected by the detection system 3 and the end point of the delay period Td1 is supposed to be the point in time when the marker M1 is rendered by the rendering unit 11. In this embodiment, the delay period Td1 is supposed to have a duration of 500 ms, for example.

In FIG. 4, V1 denotes the user's 62 view at the starting point of the delay period Td1 and V2 denotes the user's 62 view at the end point of the delay period Td1. That is to say, even during the delay period Td1, both the moving vehicle 6 and the target 50 are movable. Thus, the location of the target 50 (pedestrian 51) within the view of the user 62 (who is the driver of the moving vehicle 6) is changeable during the delay period Td1.

Figure 5:
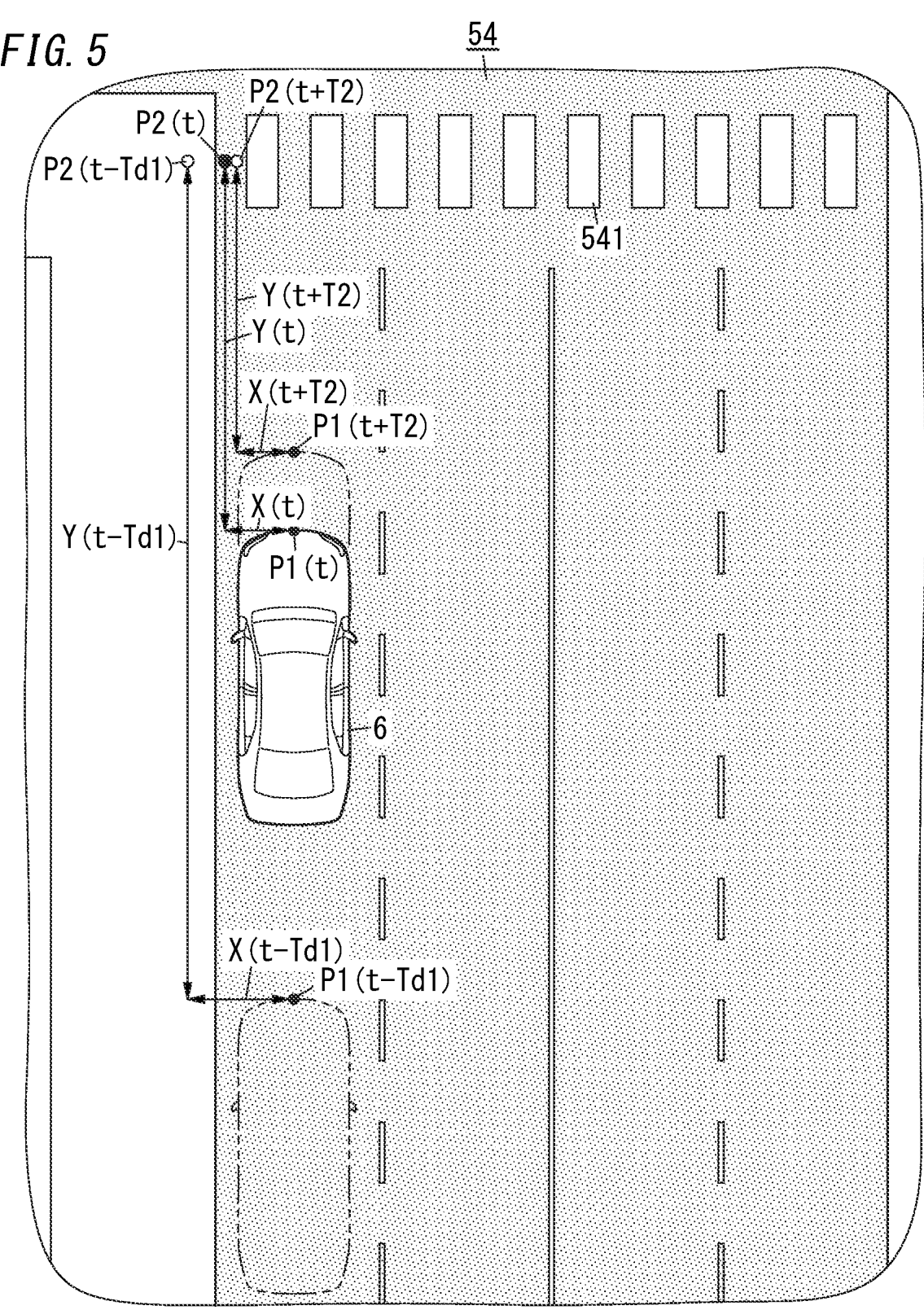
FIG. 5 is a conceptual diagram illustrating a first scene to describe an exemplary operation of the display system.
Figure 6:
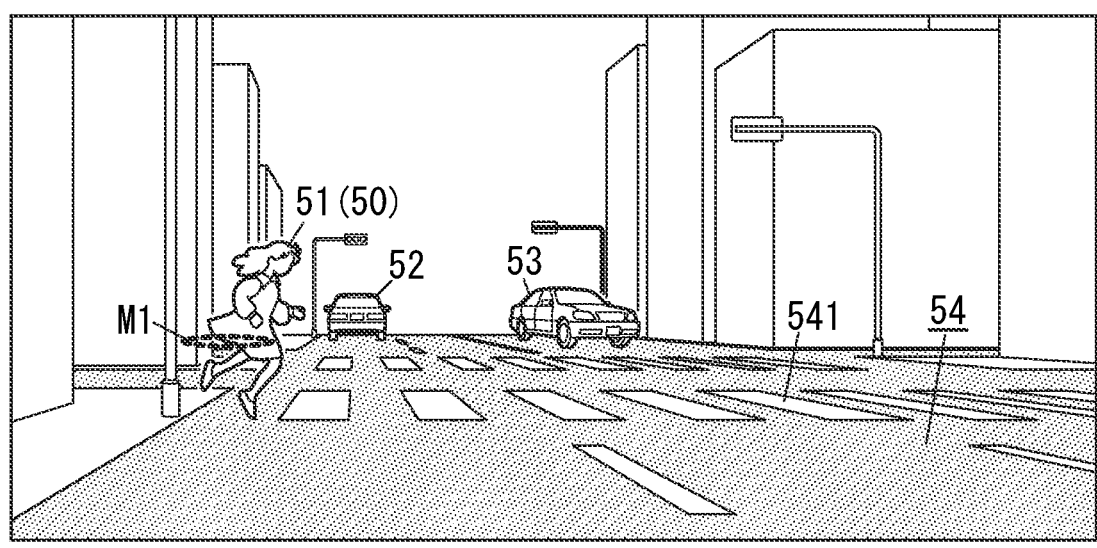
FIG. 6A illustrates a part of the user's view to describe an exemplary operation of the display system in a situation where a marker is rendered at a location yet to be corrected.
FIG. 6B illustrates a part of the user's view to describe the exemplary operation of the display system in a situation where a marker is rendered at a corrected location.
Figure 6:
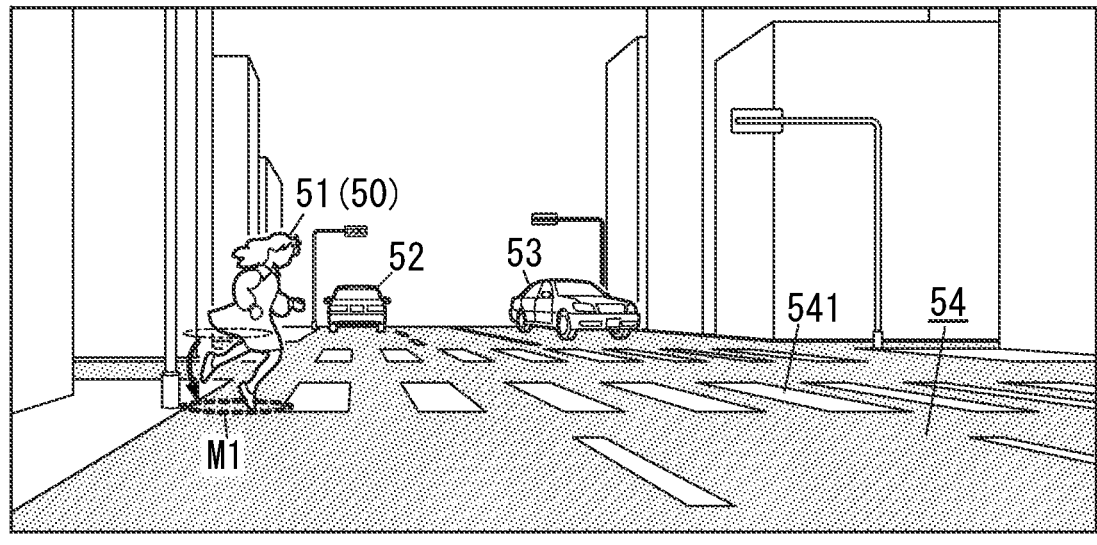

That is to say, the relation between the location of a representative point P1 of the detection system 3 (of the moving vehicle 6) and the location of a representative point P2 of the target 50 is changeable during the delay period Td1 as shown in FIG. 5. In FIG. 5, on the supposition that the point in time when the marker M1 is rendered by the rendering unit 11 (i.e., the end point of the delay period Td1) is the current time, not only the representative points P1, P2 at the current time but also representative points P1, P2 at the point in time when the target 50 is detected by the detection system 3 (i.e., the starting point of the delay period Td1) are shown as well. In FIG. 5, the representative points P1, P2 at the current time are designated by P1($t$) and P2($t$), respectively, and the representative points P1, P2 at the point in time when the target 50 is detected by the detection system 3 (i.e., the starting point of the delay period Td1) are designated by P1($t$–Td1) and P2($t$–Td1), respectively.

That is to say, in the example illustrated in FIG. 5, the relative location of the target 50 at the current time (t) as viewed from the detection system 3 (moving vehicle 6) is represented by the coordinates expressed by the following Equation (1). On the other hand, in the example illustrated in FIG. 5, the relative location of the target 50 at the point in time when the target 50 is detected by the detection system 3 (i.e., the starting point of the delay period Td1) as viewed from the detection system 3 (moving vehicle 6) is represented by the coordinates expressed by the following Equation (2):

$$(X,Y)=(X(t),Y(t)) \tag{1}$$

$$(X,Y)=(X(t-Td1),Y(t-Td1)) \tag{2}$$

As can be seen, since the relative location of the target 50 as viewed from the detection system 3 (moving vehicle 6) changes during the delay period Td1, the location yet to be corrected of the marker M1 shifts from the target 50 (pedestrian 51) as shown in FIG. 6A. That is to say, even though the target 50 is present at the relative location expressed by Equation (1) at the point in time when the marker M1 is rendered by the rendering unit 11 (i.e., at the end point of the delay period Td1), the result of detection D1 by the detection system 3 indicates the relative location expressed by Equation (2). Thus, unless the rendering location of the marker M1 that has not been subjected to the correction by the correction unit 12 yet (i.e., the location yet to be corrected) is corrected, the marker M1 displayed will shift from the location corresponding to the actual location of the target 50 (pedestrian 51) as shown in FIG. 6A.

The rendering system 1 according to this embodiment makes the correction unit 12 compensate for such shift of the marker M1, thereby enabling displaying the marker M1 at the location corresponding to the target 50 (pedestrian 51) as shown in FIG. 6B. That is to say, the correction unit 12 corrects, based on the correction data D2 that reflects at least the traveling information (i.e., information about the traveling condition of the moving vehicle 6), the location of the marker M1 to be rendered by the rendering unit 11. Besides, according to this embodiment, the correction data D2 is data obtained based on not only the traveling information but also target information about the traveling condition of the target 50 as well. That is to say, the correction made by the correction unit 12 reflects the traveling condition of the moving vehicle 6 and the traveling condition of the target 50. As a result, the marker M1 is rendered at the location corresponding to the location of the pedestrian 51 that is the target 50 as shown in FIG. 6B. Specifically, the marker M1 is displayed as an encircled marker at the feet of the pedestrian 51 as the target 50 to surround the pedestrian 51.

In particular, according to this embodiment, the traveling information reflected on the correction data D2 is information about the traveling condition of the moving vehicle 6 in the delay period Td1 including at least the period from the point in time when the target 50 is detected by the detection system 3 to the point in time when the marker M1 is rendered by the rendering unit 11. This enables reflecting the respective traveling conditions of the moving vehicle 6 and the target 50 during the delay period Td1 on the correction to be made by the correction unit 12, thus making it easier to reduce the shift of the display location of the marker M1 due to the presence of the delay period Td1.

More specifically, the correction unit 12 corrects, based on the correction data D2 generated by the prediction unit 15, the location of the marker M1 to be rendered by the rendering unit 11. In this case, the prediction unit 15 predicts, based on at least the past behavior of the moving vehicle 6, the traveling condition (traveling information) of the moving vehicle 6 in the delay period Td1. Specifically, the prediction unit 15 may predict the traveling condition of the moving vehicle 6 during the delay period Td1 by using an output signal, acquired during the delay period Td1, of the sensor 17. That is to say, since the output signal of the sensor 17 reflects the traveling condition of the moving vehicle 6 in real time, the prediction unit 15 may predict, based on the output signal of the sensor 17, the traveling condition of the moving vehicle 6 during the delay period Td1.

In addition, the prediction unit 15 predicts, based on at least the past behavior of the target 50, the traveling condition of the target 50 (target information) during the delay period Td1. Specifically, the prediction unit 15 may predict the traveling condition of the target 50 during the delay period Td1 by using at least the result of detection D1 by the detection system 3 that has been acquired just before the delay period Td1. That is to say, the result of detection D1 by the detection system 3 includes, as the attributes of the target 50, information representing its traveling condition (such as a moving velocity, the magnitude of movement, a traveling direction, acceleration, the duration of traveling, and the orientation during traveling) if the target 50 is moving. This allows the prediction unit 15 to predict, based on at least the traveling condition of the target 50 just before the delay period Td1, the traveling condition of the target 50 during the delay period Td1. In this case, the prediction unit 15 may also use, for example, the type of the target 50, which is included as an attribute of the target 50 in the result of detection D1 by the detection system 3, for predicting the traveling condition of the target 50 during the delay period Td1.

Then, the prediction unit 15 calculates, based on the traveling information and the target information, the magnitude of variation ΔX1, ΔY1 in the relative location of the target 50 during the delay period Td1 as viewed from the detection system 3 (moving vehicle 6) by, for example, the following Equations (3):

$$\Delta X1 = \int_{t-Td1}^{t} \{a_X(t-Td1)\cdot x + V_X(t-Td1)\}dx, \tag{3}$$

$$\Delta Y1 = \int_{t-Td1}^{t} \{a_Y(t-Td1)\cdot y + V_Y(t-Td1)\}dy$$

where $\alpha_X$(t−Td1) is the relative acceleration in the X-axis direction between the moving vehicle 6 and the target 50 at a time (t−Td1), $\alpha_y$(t−Td1) is the relative acceleration in the Y-axis direction between the moving vehicle 6 and the target 50 at the time (t−Td1), $V_x$(t−Td1) is the relative velocity in the X-axis direction between the moving vehicle 6 and the target 50 at the time (t−Td1), and $V_y$(t−Td1) is the relative velocity in the Y-axis direction between the moving vehicle 6 and the target 50 at the time (t−Td1).

The prediction unit 15 outputs the correction data D2, including the magnitudes of variations ΔX1, ΔY1 thus calculated, to the correction unit 12. This allows the correction unit 12 to correct, based on these magnitudes of variations ΔX1, ΔY1, the location of the marker M1 to be rendered by the rendering unit 11.

(2.4.2) Interpolation Operation

Figure 7:
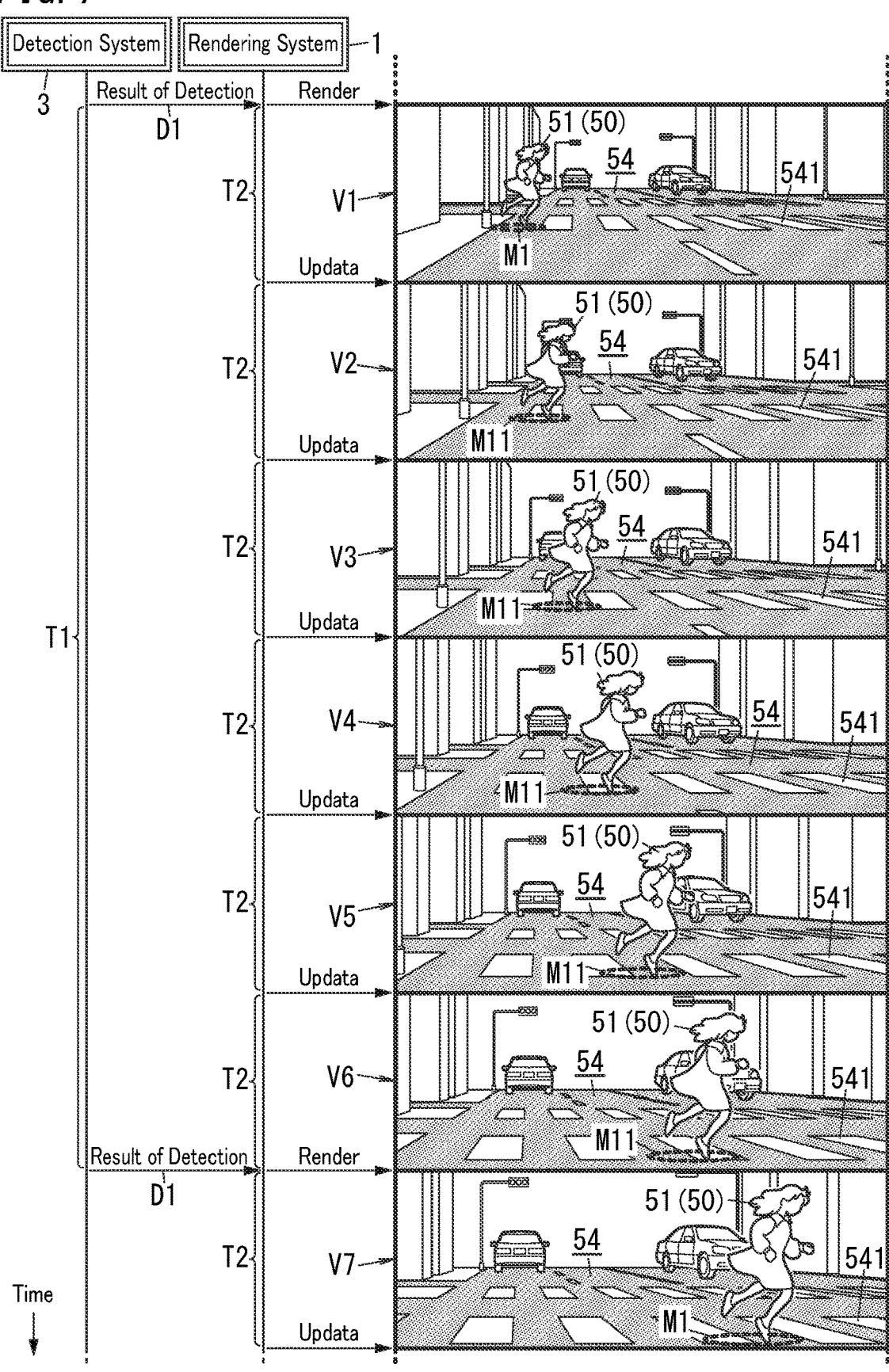
FIG. 7 is a conceptual diagram for use to describe an exemplary operation of the rendering system.

Next, the interpolation operation to be performed mainly by the interpolation unit 13 will be described with reference to FIGS. 5 and 7. FIG. 7 conceptually illustrates how the detection system 3 and the rendering system 1 operate. In FIG. 7, the axis of ordinates is a time axis indicating a timing when the rendering system 1 acquires the result of detection D1 from the detection system 3 and a timing when the rendering system 1 renders or updates the marker M1. FIG. 7 also schematically illustrates the user's 62 views V1-V7 when the rendering system 1 renders or updates the marker M1. Each of these views V1-V7 is a part of the user's 62 view including the marker M1 displayed by the display system 10. Note that the reference signs, the leader lines, and other indicators are shown in FIG. 7 just for the purpose of description and are not actually visually recognized by the user 62.

As shown in FIG. 7, the rendering system 1 acquires the result of detection D1 by the detection system 3 in every first cycle T1. In addition, the rendering unit 11 renders, based on the result of detection D1 by the detection system 3, a marker M1 corresponding to the location of the target 50 in at least every first cycle T1. In this case, in the example illustrated in FIG. 7, the correction to the rendering location of the marker M1 as described in the "(2.4.1) Correction operation" section is supposed to have already been done. Thus, at the timing when the rendering unit 11 renders, based on the result of detection D1 by the detection system 3, the marker M1 in every first cycle T1, the marker M1 may be displayed at the location corresponding to the target 50 (pedestrian 51). Thus, in each of the user's 62 views designated by V1 and V7 in FIG. 7, the marker M1 is rendered at the location corresponding to the target 50 (pedestrian 51).

Furthermore, the rendering unit 11 updates the marker M1 in every second cycle T2, which is shorter than the first cycle T1. That is to say, during each first cycle T1 from a point in time when the rendering system 1 acquires the result of detection D1 by the detection system 3 to a point in time when the rendering system 1 acquires the result of detection D1 next time, the rendering unit 11 updates the marker M1 every time one second cycle T2 passes. In addition, even during each second cycle T2, both the moving vehicle 6 and the target 50 are movable, and therefore, the location of the target 50 (pedestrian 51) within the user's 62 view is changeable.

That is to say, the relation between the location of a representative point P1 of the detection system 3 (of the moving vehicle 6) and the location of a representative point P2 of the target 50 is changeable during each second cycle T2 as shown in FIG. 5. In FIG. 5, on the supposition that the point in time when the marker M1 is rendered based on the result of detection D1 by the detection system 3 is the current time, not only the representative points P1, P2 at the current time but also representative points P1, P2 at the point in time when one second cycle T2 has passed since the current time (i.e., a point in time when the marker M1 is updated) are shown as well. In FIG. 5, the representative points P1, P2 at the current time are designated by P1(t) and P2(t), respectively, and the representative points P1, P2 at the point in time when one second cycle T2 has passed since the current time (i.e., a point in time when the marker M1 is updated) are designated by P1(t+T2) and P2(t+T2), respectively.

That is to say, in the example illustrated in FIG. 5, the relative location of the target 50 at the current time (t) as viewed from the detection system 3 (moving vehicle 6) is represented by the coordinates expressed by the Equation (1) described above. On the other hand, in the example illustrated in FIG. 5, the relative location of the target 50 at the point in time when one second cycle T2 has passed since the current time as viewed from the detection system 3 (moving vehicle 6) is represented by the coordinates expressed by the following Equation (4):

$$(X,Y)=(X(t+T2),Y(t+T2)) \tag{4}$$

As can be seen, since the relative location of the target 50 as viewed from the detection system 3 (moving vehicle 6) changes during each second cycle T2, the location of the target 50 (pedestrian 51) will shift from the reference location of the marker M1 at a point in time when the marker M1 is updated by the rendering unit 11. That is to say, even though the target 50 is present at the relative location expressed by Equation (4) at the point in time when the marker M1 is updated by the rendering unit 11, the result of detection D1 by the detection system 3 indicates the relative location expressed by Equation (1). Thus, unless the rendering location (reference location) of the marker M1 based on the result of detection D1 by the detection system 3 is subjected to interpolation, the marker M1 displayed will shift from the location corresponding to the actual location of the target 50 (pedestrian 51).

The rendering system 1 according to this embodiment has the interpolation unit 13 make interpolation, thereby enabling displaying an interpolated marker M11 at a location corresponding to the target 50 (pedestrian 51), even when the rendering unit 11 updates the marker M1 in every second cycle T2. That is to say, the interpolation unit 13 determines, based on interpolation data D3 that reflects at least the traveling information (i.e., information about the traveling condition of the moving vehicle 6), the rendering location of the interpolated marker M11. Besides, according to this embodiment, the interpolation data D3 is data obtained based on not only the traveling information but also target information about the traveling condition of the target 50 as well. That is to say, the interpolated marker M11 obtained by the interpolation unit 13 through interpolation reflects the traveling condition of the moving vehicle 6 and the traveling condition of the target 50. As a result, in each of the user's views designated by V2 to V6, the interpolated marker M11 is also rendered at the location corresponding to the location of the pedestrian 51 that is the target 50 as shown in FIG. 7. Specifically, the interpolated marker M11 is rendered as an encircled marker at the feet of the pedestrian 51 as the target 50 to surround the pedestrian 51.

More specifically, the interpolation unit 13 obtains, based on the interpolation data D3 generated by the prediction unit 15, the interpolated marker M11 as the marker M1 that has been updated by the rendering unit 11. In this case, the prediction unit 15 predicts, based on at least the past behavior of the moving vehicle 6, the traveling condition (traveling information) of the moving vehicle 6 in each second cycle T2. Specifically, the prediction unit 15 may predict the traveling condition of the moving vehicle 6 during the second cycle T2 by using an output signal, acquired during the second cycle T2, of the sensor 17. That is to say, since the output signal of the sensor 17 reflects the traveling condition of the moving vehicle 6 in real time, the prediction unit 15 may predict, based on the output signal of the sensor 17, the traveling condition of the moving vehicle 6 during the second cycle T2.

In addition, the prediction unit 15 predicts, based on at least the past behavior of the target 50, the traveling condition of the target 50 (target information) during each second cycle T2. Specifically, the prediction unit 15 may predict the traveling condition of the target 50 during the second cycle T2 by using at least the result of detection D1 by the detection system 3 that has been acquired just before the second cycle T2. That is to say, the result of detection D1 by the detection system 3 includes, as the attributes of the target 50, information representing its traveling condition (such as a moving velocity, the magnitude of movement, a traveling direction, acceleration, the duration of traveling, and the orientation during traveling) if the target 50 is moving. This allows the prediction unit 15 to predict, based on at least the traveling condition of the target 50 just before the second cycle T2, the traveling condition of the target 50 during the second cycle T2. In this case, the prediction unit 15 may also use, for example, the type of the target 50, which is included as an attribute of the target 50 in the result of detection D1 by the detection system 3, for predicting the traveling condition of the target 50 during the second cycle T2.

Then, the prediction unit 15 calculates, based on the traveling information and the target information, the magnitude of variation $\Delta X2$, $\Delta Y2$ in the relative location of the target 50 at a point in time when the second cycle T2 has passed (i.e., at a point in time for updating) as viewed from the detection system 3 (moving vehicle 6) by, for example, the following Equations (5):

$$\Delta X2 = \int_{t}^{t+T2} \{a_X(t) \cdot x + V_X(t)\}dx, \tag{5}$$

$$\Delta Y2 = \int_{t}^{t+T2} \{a_Y(t) \cdot y + V_Y(t)\}dy$$

where $\alpha_x(t)$ is the relative acceleration in the X-axis direction between the moving vehicle 6 and the target 50 at a current time (t), $\alpha_y(t)$ is the relative acceleration in the Y-axis direction between the moving vehicle 6 and the target 50 at the current time (t), $V_x(t)$ is the relative velocity in the X-axis direction between the moving vehicle 6 and the target 50 at the current time (t), and $V_y(t)$ is the relative velocity in the Y-axis direction between the moving vehicle 6 and the target 50 at the current time (t).

The prediction unit 15 outputs the interpolation data D3, including the magnitudes of variations $\Delta X2$, $\Delta Y2$ thus calculated, to the interpolation unit 13. This allows the interpolation unit 13 to determine, based on these magnitudes of variations $\Delta X2$, $\Delta Y2$, the rendering location of the interpolated marker M11.

The rendering system 1 has the interpolation unit 13 make such interpolation every time the rendering unit 11 updates the marker M1. That is to say, the interpolation is made by the interpolation unit 13 every second cycle T2. Thus, in each of the views V2-V6, the interpolated marker M11 corresponding to the location of the pedestrian 51 as the target 50 is rendered to the user's 62 eye as shown in FIG. 7.

(2.4.3) Second Scene

Next, it will be described with reference to FIGS. 8 and 9 how the rendering system 1 operates in a second scene in which a traffic light 55 is detected as the target 50 by the detection system 3.

FIG. 8 illustrates a view of the user 62 who is driving the moving vehicle 6. Note that the reference signs, the leader lines, and other indicators are shown in FIG. 8 just for the purpose of description and are not actually visually recognized by the user 62. In this example, the traffic light 55 detected as the target 50 by the detection system 3 is installed in front of the moving vehicle 6 as shown in FIG. 8.

In the example illustrated in FIG. 8, a marker M1 is rendered at a location corresponding to the location of the traffic light 55 as the target 50. Specifically, a marker M1 is rendered as a balloon pointing at the target 50 under the traffic light 55 as the target 50. That is to say, the marker M1 is displayed, in plan view (bird's-eye view), at a location corresponding to the traffic light 55 as the target 50 (e.g., at the same location as the traffic light 55 as the target 50 in this example). In addition, in the example illustrated in FIG. 8, the marker M1 displayed includes a character string "STOP," prompting the user 62 to stop the moving vehicle 6, in the balloon, since the traffic light 55 as the target 50 is now red. Thus, to the user's 62 eyes, the traffic light 55 looks as if the balloon (marker M1) were extended from the traffic light 55 (as the target 50).

As can be seen, even if the target 50 is a stationary object, the target 50 still moves relatively as viewed from the moving vehicle 6 as the moving vehicle 6 moves. That is to say, as long as the moving vehicle 6 is moving, the relation between the location of a representative point P1 of the detection system 3 (of the moving vehicle 6) and the location of a representative point P2 of the target 50 is changeable during the delay period Td1 and the second cycle T2 as shown in FIG. 9. In FIG. 9, not only the representative points P1, P2 at the current time but also representative points P1, P2 at the point in time when the target 50 is detected by the detection system 3 and representative points P1, P2 at the point in time when the second cycle T2 has passed since the current time are shown as well. In FIG. 9, the representative points P1, P2 at the current time are designated by P1($t$) and P2($t$), respectively, the representative point P1 at the point in time when the target 50 is detected by the detection system 3 is designated by P1($t$−Td1), and the representative point P1 at the point in time when the second cycle T2 has passed since the current time is designated by P1($t$+T2).

In short, even if the target 50 is a stationary object, the relative location of the target 50 as viewed from the detection system 3 (moving vehicle 6) is still changeable. Thus, the operations of the rendering system 1 as described in the "(2.4.1) Correction operation" section and the "(2.4.2) Interpolation operation" section are also effectively applicable to the second scene.

(2.4.4) Flowchart

Figure 10:
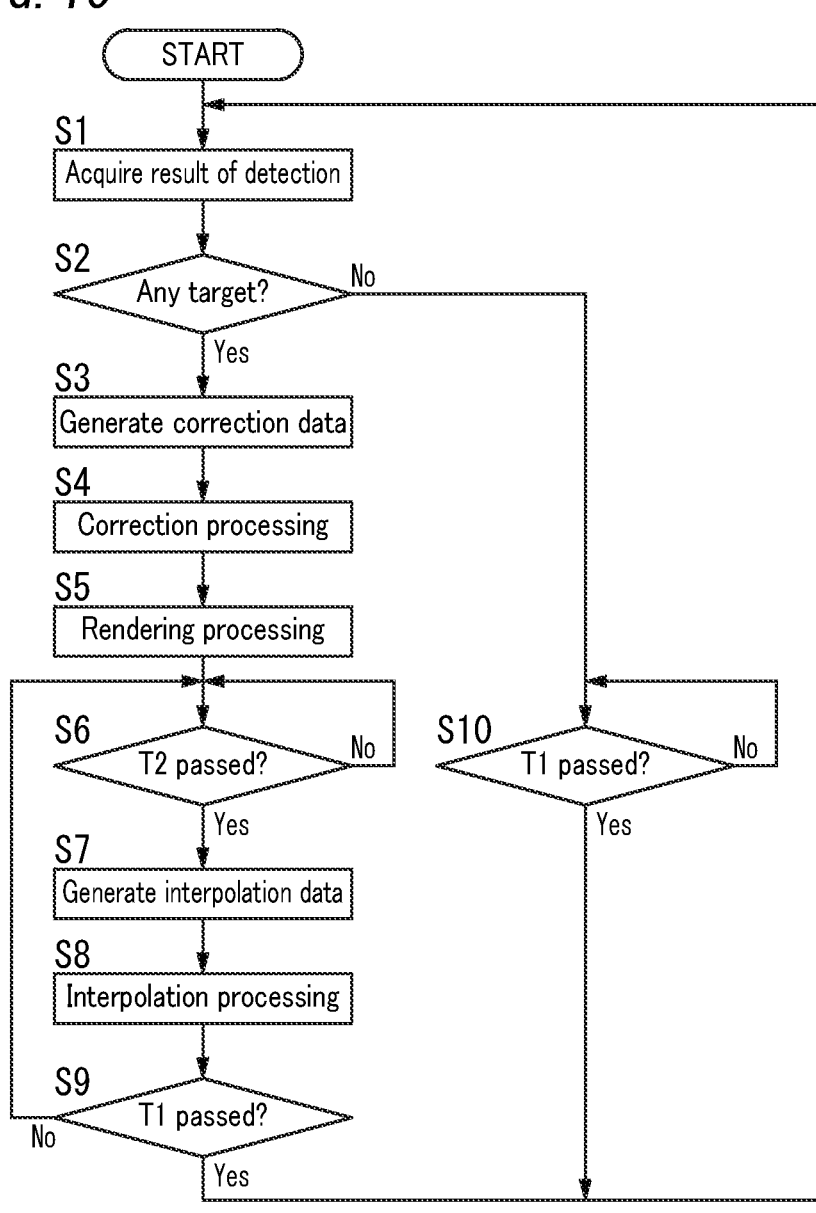
FIG. 10 is a flowchart illustrating an overall operation of the rendering system and display system according to the first embodiment.

FIG. 10 is a flowchart showing an exemplary overall operation of the rendering system 1, i.e., an overall processing flow of the rendering method.

First, the rendering system 1 makes the input information processing unit 14 acquire the result of detection D1 by the detection system 3 from the detection system 3 (in S1). In this processing step, the rendering system 1 checks information, included in the result of detection D1 by the detection system 3, indicating whether there is any target 50 or not (in S2).

If there is any target 50 (if the answer is YES in Step S2), then the rendering system 1 makes the prediction unit 15 generate correction data D2 based on at least traveling information about the traveling condition of the moving vehicle 6 (in S3). Then, the rendering system 1 makes the correction unit 12 perform the correction processing of correcting, based on the correction data D2 thus generated, the rendering location of the marker M1 (in S4). Furthermore, the rendering system 1 makes the rendering unit 11 perform the rendering processing of rendering the marker M1 at the corrected rendering location (i.e., the corrected location) (in S5).

Thereafter, the rendering system 1 determines whether one second cycle T2 has passed or not (in S6). If one second cycle T2 has not passed yet (if the answer is NO in Step S6), the rendering system 1 waits. When one second cycle T2 has passed (if the answer is YES in Step S6), the rendering system 1 makes the prediction unit 15 generate interpolation data D3 based on at least traveling information about the traveling condition of the moving vehicle 6 (in S7). Then, the rendering system 1 makes the interpolation unit 13 perform the interpolation processing of obtaining an interpolated marker M11 through interpolation based on the interpolation data D3 thus generated (in S8). The interpolated marker M11 obtained by the interpolation processing is rendered when an update is made by the rendering unit 11.

Thereafter, the rendering system 1 determines whether one first cycle T1 has passed yet (in S9). If one first cycle T1 has not passed yet (if the answer is NO in Step S9), the rendering system 1 goes back to the processing step S6. When one first cycle T1 has passed (if the answer is YES in Step S9), the rendering system 1 goes back to the processing step S1.

Meanwhile, if a decision is made in the processing step S2 that there be no targets 50 (if the answer is NO in Step S2), then the rendering system 1 determines whether one first cycle T1 has passed yet (in S10). If one first cycle T1 has not passed yet (if the answer is NO in Step S10), the rendering system 1 waits. When one first cycle T1 has passed (if the answer is YES in Step S10), the rendering system 1 goes back to the processing step S1.

The rendering system 1 repeatedly performs this series of processing steps S1-S10 over and over again. Note that the flowchart shown in FIG. 10 shows only an exemplary procedure of operation of the rendering system 1 and should not be construed as limiting. Rather, any of these processing steps may be omitted, an additional processing step may be performed as needed, and/or these processing steps may be performed in a different order, as appropriate.

(3) Variations

Note that the first embodiment described above is only an exemplary one of various embodiments of the present disclosure and should not be construed as limiting. Rather, the first exemplary embodiment may be readily modified in various manners depending on a design choice or any other factor without departing from the scope of the present disclosure. The drawings to be referred to in the description of embodiments are all schematic representations. Thus, the ratio of the dimensions (including thicknesses) of respective constituent elements illustrated on the drawings does not always reflect their actual dimensional ratio. Also, the functions of the rendering system 1 according to the first embodiment may also be implemented as a rendering method, a program, or a non-transitory storage medium on which the program is stored, for example.

A rendering method according to an aspect includes rendering processing (corresponding to S5 in FIG. 10) and correction processing (corresponding to S4 in FIG. 10). The rendering processing includes rendering, based on a result of detection D1 by a detection system 3, a marker M1 corresponding to a location of the target 50. The detection system 3 is installed in a moving vehicle 6 for the purpose of detecting the target 50. The correction processing includes correcting, based on correction data D2, the location of the target 50 in accordance with the result of detection D1 by the detection system 3 and thereby determining a location of the marker M1 to be rendered in the rendering processing. The correction data D2 is obtained based on at least traveling information about a traveling condition of the moving vehicle 6. A program according to another aspect is designed to cause one or more processors to perform this rendering method.

A rendering method according to another aspect includes rendering processing (corresponding to S5 in FIG. 10) and interpolation processing (corresponding to S8 in FIG. 10). The rendering processing includes rendering, based on a result of detection D1 by a detection system 3, a marker M1 corresponding to a location of a target 50 at least in every first cycle T1. The detection system 3 detects the target 50 and outputs the result of detection D1 in every first cycle T1. The interpolation processing includes making, whenever updating the marker M1 in every second cycle shorter than the first cycle T1, interpolation based on interpolation data D3 to obtain an interpolated marker M11 as the marker M1 that has been updated. A program according to another aspect is designed to cause one or more processors to perform this rendering method.

Next, variations of the first exemplary embodiment will be enumerated one after another. Note that the variations to be described below may be adopted in combination as appropriate.

The rendering system 1 according to the present disclosure includes a computer system. The computer system may include, as principal hardware components, a processor and a memory. The functions of the rendering system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the rendering system 1 are integrated together in a single housing. However, this is not an essential configuration for the rendering system 1. Alternatively, constituent elements of the rendering system 1 may be distributed in multiple different housings. For example, the correction unit 12 or interpolation unit 13 of the rendering system 1 may be provided in a different housing from the rendering unit 11. Still alternatively, at least some functions of the rendering system 1 may be implemented as a cloud computing system as well.

Conversely, at least some of the plurality of functions distributed in multiple devices in the first embodiment may be aggregated together in a single housing. For example, the functions distributed in the rendering system 1 and the detection system 3 may be aggregated together in a single housing.

Furthermore, the display device 2 does not have to be integrated with the rendering system 1. Alternatively, the rendering system 1 and the display device 2 that form the display system 10 may be housed in two different housings.

Furthermore, the moving vehicle 6 to be equipped with the display system 10 does not have to be an automobile (passenger car) but may also be a large car such as a truck or a bus, a two-wheeled vehicle, a railway train, a motorized cart, a construction machine, an aircraft, or a watercraft, for example.

Furthermore, the rendering system 1 only needs to render the marker M1 corresponding to the location of the target 50. For example, the rendering system 1 may also render, as the marker M1, various types of driver assistance information such as vehicle velocity information, navigation information, foregoing vehicle information, lane deviation information, and vehicle condition information.

Furthermore, the display device 2 does not have to be configured to display a virtual image as is done by a head-up display. Alternatively, the display device 2 may also be a liquid crystal display, an organic electroluminescent (EL) display, or a projector, for example. Still alternatively, the display device 2 may also be the display of a car navigation system, an electronic mirror system, or a multi-information display device, all of which may be installed in the moving vehicle body 61.

Furthermore, the durations of the first cycle T1 and second cycle T2 adopted in the first embodiment are only examples. That is to say, the duration of the first cycle T1 does not have to be 600 ms and the duration of the second cycle T2 does not have to be 100 ms, either. For example, the first cycle T1 may have a duration of 100 ms and the second cycle T2 may have a duration of 16.7 ms. Alternatively, the first cycle T1 may have a duration of 100 ms and the second cycle T2 may have a duration of 20 ms. Still alternatively, the first cycle T1 may have a duration of 80 ms and the second cycle T2 may have a duration of 50 ms.

Furthermore, the length of the delay period Td1 adopted in the first embodiment described above is only an example. That is to say, the length of the delay period Td1 does not have to be 500 ms. The length of the delay period Td1 may be appropriately determined according to the system configuration or any other factor within the range from 10 ms to 1 s, for instance. For example, the length of the delay period Td1 may be 50 ms, 150 ms, or 300 ms, whichever is appropriate.

Furthermore, the sensor 17 does not have to detect angular velocities around the three axes. Alternatively, the sensor 17 may detect an angular velocity around one axis or may also detect angular velocities around two axes or even four or more axes. Furthermore, the sensor 17 does not have to be a gyrosensor for detecting an angular velocity. Alternatively, the sensor 17 may also be, for example, a sensor for detecting acceleration, angular acceleration, or velocity either in addition to, or instead of, the angular velocity.

Furthermore, the prediction unit 15 does not have to be included in the rendering system 1. Alternatively, the function of the prediction unit 15 may also be included in the detection system 3 or the ECU 4. In that case, the rendering system 1 acquires the correction data D2 and interpolation data D3, obtained by the prediction unit 15 of the detection system 3 or the ECU 4, from either the detection system 3 or the ECU 4.

Optionally, the prediction unit 15 may predict, using a machine-learned classifier, for example, the traveling information about the traveling condition of the moving vehicle 6 and the target information about the traveling condition of the target 50. The classifier may perform re-learning while the rendering system 1 is being used. Examples of the classifier include not only a linear classifier such as a support vector machine (SVM) but also a classifier that uses a neural network or a classifier generated by deep learning that uses a multilayer neural network. If the classifier is a classifier that uses a learned neural network, then examples of the learned neural network include a convolutional neural network (CNN) and a Bayesian neural network (BNN). In that case, the prediction unit 15 may be implemented by, for example, installing a learned neural network into an integrated circuit such as an application specific integrated circuit (ASIC) or a field-programmable gate array (FPGA).

Second Embodiment

Figure 11:
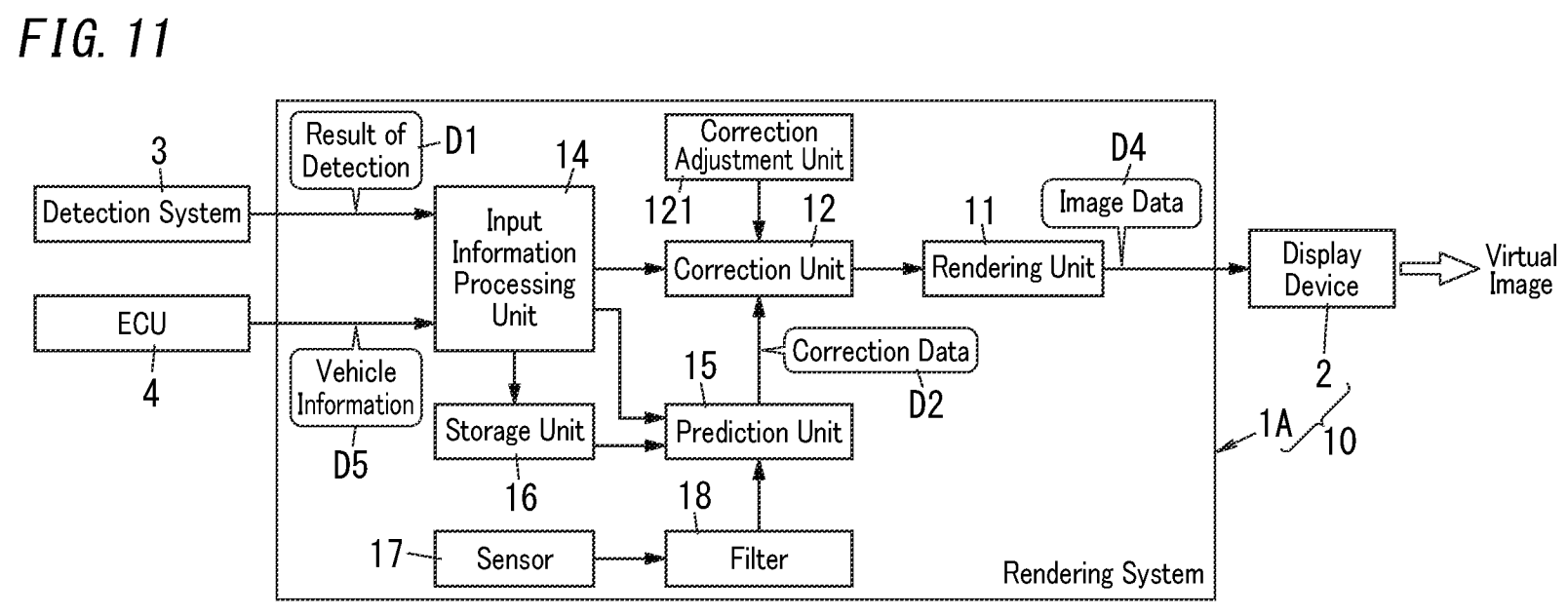

A rendering system 1A according to a second embodiment includes neither the interpolation unit 13 (see FIG. 1) nor the interpolation adjustment unit 131 (see FIG. 1) as shown in FIG. 11, which is a major difference from the first embodiment described above. In the following description, any constituent element of this second embodiment, having the same function as a counterpart of the first embodiment described above, will be designated by the same reference numeral as that counterpart's, and description thereof will be omitted herein as appropriate.

In this embodiment, the interpolation unit 13 is omitted, and therefore, the prediction unit 15 generates no interpolation data D3 (see FIG. 1), either. Meanwhile, the correction unit 12 operates in the same way as the counterpart of the first embodiment. The correction unit 12 also corrects, based on the correction data D2, the location of the marker M1 to be rendered by the rendering unit 11.

Nevertheless, in this embodiment, one second cycle T2 in which the rendering unit 11 updates the marker M1 is supposed to be either as long as, or longer than, one first cycle T1 in which the rendering system 1A acquires the result of detection D1 by the detection system 3. Thus, the rendering system 1A according to this embodiment enables rendering, based on the result of detection D1 by the detection system 3, the marker M1 in every second cycle T2, thus making it unnecessary to have interpolation made by the interpolation unit 13.

Note that the various configurations described for the second embodiment may be adopted as appropriate in combination with the various configurations (including their variations) described for the first embodiment.
(Recapitulation)

As can be seen from the foregoing description, a rendering system (1, 1A) according to a first aspect includes a rendering unit (11) and a correction unit (12). The rendering unit (11) renders, based on a result of detection (D1) by a detection system (3), a marker (M1) corresponding to a location of a target (50). The detection system (3) is installed in a moving vehicle (6) for the purpose of detecting the target (50). The correction unit (12) corrects, based on correction data (D2), the location of the target (50) in accordance with the result of detection (D1) by the detection system (3) and thereby determines a location of the marker (M1) to be rendered by the rendering unit (11). The correction data (D2) is obtained based on at least traveling information about a traveling condition of the moving vehicle (6).

According to this aspect, the marker (M1) is rendered at a rendering location that has been subjected to correction based the correction data (D2), not at a location of the target (50) based the result of detection (D1) by the detection system (3). This enables reducing, even if a delay, for example, is caused by processing inside the detection system (3), the chances of the display location of the marker (M1) finally displayed being affected by the delay. In particular, the correction is made based on the traveling condition of the moving vehicle (6) equipped with the detection system (3). This enables reducing the shift of the display location due to the movement of the detection system (3) itself during the delay period (Td1) described above.

In a rendering system (1, 1A) according to a second aspect, which may be implemented in conjunction with the first aspect, the traveling information is predictable from at least past behavior of the moving vehicle (6).

This aspect enables relatively accurately predicting the traveling condition of the moving vehicle (6) for use to correct the rendering location of the marker (M1).

In a rendering system (1, 1A) according to a third aspect, which may be implemented in conjunction with the first or second aspect, the correction data (D2) is obtained based on not only the traveling information but also target information about a traveling condition of the target (50).

This aspect enables relatively accurately correcting the rendering location of the marker (M1) even if the target (50) is moving.

In a rendering system (1, 1A) according to a fourth aspect, which may be implemented in conjunction with the third aspect, the target information is predictable from at least past behavior of the target (50).

This aspect enables relatively accurately predicting the traveling condition of the target (50) for use to correct the rendering location of the marker (M1).

In a rendering system (1, 1A) according to a fifth aspect, which may be implemented in conjunction with any one of the first to fourth aspects, the marker (M1) is a three-dimensional image including location information in a depth direction and representing a distance from the detection system (3) to the target (50).

This aspect allows the marker (M1) displayed to reflect the distance from the detection system (3) to the target (50) as well.

A rendering system (1, 1A) according to a sixth aspect, which may be implemented in conjunction with any one of the first to fifth aspects, further includes an interpolation unit (13). The detection system (3) outputs the result of detection (D1) in every first cycle (T1). The rendering unit (11) renders, based on the result of detection (D1) by the detection system (3), the marker (M1) at least in every first cycle (T1) and updates the marker (M1) in every second cycle (T2). The second cycle (T2) is shorter than the first cycle (T1). The interpolation unit (13) makes, whenever the rendering unit (11) updates the marker (M1) in every second cycle (T2), interpolation based on interpolation data (D3) to obtain an interpolated marker (M11) as the marker (M1) that has been updated.

According to this aspect, in a situation where the second cycle (T2) in which the marker (M1) is updated is shorter than the first cycle (T1) in which the detection system (3) outputs the result of detection (D1), the updated marker (M1) is obtained through interpolation based on the interpolation data (D3). This enables changing, even during the first cycle (T1), the marker (M1) every time the marker (M1) is updated, thus allowing the marker (M1) to move relatively smoothly. Consequently, this reduces the chances of the marker (M1) exhibiting unnatural behavior.

In a rendering system (1, 1A) according to a seventh aspect, which may be implemented in conjunction with any one of the first to sixth aspects, the correction unit (12) determines contents of the marker (M1) in accordance with the correction data (D2).

This aspect enables appropriately correcting the contents of the marker (M1).

A rendering system (1, 1A) according to an eighth aspect, which may be implemented in conjunction with any one of the first to seventh aspects, further includes a correction adjustment unit (121) that adjusts strength of the correction to be made by the correction unit (12).

This aspect enables reducing the processing load caused by the correction by, for example, decreasing the strength of the correction to be made by the correction unit (12).

In a rendering system (1, 1A) according to a ninth aspect, which may be implemented in conjunction with any one of the first to eighth aspects, the traveling information is information about the traveling condition of the moving vehicle (6) in a delay period (Td1). The delay period (Td1) includes at least a period from a point in time when the detection system (3) detects the target (50) to a point in time when the rendering unit (11) renders the target (50).

This aspect makes it easier to reduce the shift of the display location of the marker (M1) due to the presence of the delay period (Td1).

A display system (10) according to a tenth aspect includes the rendering system (1, 1A) according to any one of the first to ninth aspects and a display device (2) that displays thereon the marker (M1) rendered by the rendering system (1, 1A).

According to this aspect, the marker (M1) is rendered at a rendering location that has been subjected to correction based the correction data (D2), not at a location of the target (50) based the result of detection (D1) by the detection system (3). This enables reducing, even if a delay, for example, is caused by processing inside the detection system (3), the chances of the display location of the marker (M1) finally displayed being affected by the delay. In particular, the correction is made based on the traveling condition of the moving vehicle (6) equipped with the detection system (3). This enables reducing the shift of the display location due to the movement of the detection system (3) itself during the delay period (Td1) described above.

A moving vehicle (6) according to an eleventh aspect includes the display system (10) according to the tenth aspect and a moving vehicle body (61) to be equipped with the display system (10).

According to this aspect, the marker (M1) is rendered at a rendering location that has been subjected to correction based the correction data (D2), not at a location of the target (50) based the result of detection (D1) by the detection system (3). This enables reducing, even if a delay, for example, is caused by processing inside the detection system (3), the chances of the display location of the marker (M1) finally displayed being affected by the delay. In particular, the correction is made based on the traveling condition of the moving vehicle (6) equipped with the detection system (3). This enables reducing the shift of the display location due to the movement of the detection system (3) itself during the delay period (Td1) described above.

A rendering method according to a twelfth aspect includes rendering processing and correction processing. The rendering processing includes rendering, based on a result of detection (D1) by a detection system (3), a marker (M1) corresponding to a location of the target (50). The detection system (3) is installed in a moving vehicle (6) for the purpose of detecting the target (50). The correction processing includes correcting, based on correction data (D2), the location of the target (50) in accordance with the result of detection (D1) by the detection system (3) and thereby determining a location of the marker (M1) to be rendered in the rendering processing. The correction data (D2) is obtained based on at least traveling information about a traveling condition of the moving vehicle (6).

According to this aspect, the marker (M1) is rendered at a rendering location that has been subjected to correction based the correction data (D2), not at a location of the target (50) based the result of detection (D1) by the detection system (3). This enables reducing, even if a delay, for example, is caused by processing inside the detection system (3), the chances of the display location of the marker (M1) finally displayed being affected by the delay. In particular, the correction is made based on the traveling condition of the moving vehicle (6) equipped with the detection system (3). This enables reducing the shift of the display location due to the movement of the detection system (3) itself during the delay period (Td1) described above.

A non-transitory storage medium according to a thirteenth aspect stores thereon a program designed to cause one or more processors to perform the rendering method according to the twelfth aspect.

According to this aspect, the marker (M1) is rendered at a rendering location that has been subjected to correction based the correction data (D2), not at a location of the target (50) based the result of detection (D1) by the detection system (3). This enables reducing, even if a delay, for example, is caused by processing inside the detection system (3), the chances of the display location of the marker (M1) finally displayed being affected by the delay. In particular, the correction is made based on the traveling condition of the moving vehicle (6) equipped with the detection system (3). This enables reducing the shift of the display location due to the movement of the detection system (3) itself during the delay period (Td1) described above.

Note that these are not the only aspects of the present disclosure but various configurations (including their variations) of the rendering system (1, 1A) according to the first and second embodiments described above may also be implemented as, for example, a rendering method or a program.

Note that the constituent elements according to the second to ninth aspects are not essential constituent elements for the rendering system (1, 1A) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A rendering system, comprising:

a processor; and a memory including a program that, when executed by the processor, causes the processor to perform functions, the functions including:

determining, based on a result of detection by a detection system installed in a moving vehicle for a purpose of detecting a target, a rendering location of a marker corresponding to a location of the target;

predicting, based on traveling information and target information, the location of the target in order to obtain correction data for the location of the target;

correcting the rendering location of the marker based on the correction data of the target; and rendering the marker at the corrected rendering location, wherein the correction data is obtained based on the traveling information about a traveling condition of the moving vehicle and the target information about a traveling condition of the target, the traveling information is predicted from at least past behavior of the moving vehicle equipped with the rendering system, the target information is predicted from at least past behavior of the target, and the traveling information relates to at least one of parameters including a moving velocity, a magnitude of movement, a traveling direction, acceleration, a duration of traveling, or an orientation of the moving vehicle during traveling.

2. The rendering system of claim 1, wherein the target information relates to at least one of parameters including a moving velocity, a magnitude of movement, a traveling direction, acceleration, a duration of traveling, and an orientation during traveling of the target.

3. The rendering system of claim 2, wherein the marker is a three-dimensional image including location information in a depth direction and representing a distance from the detection system to the target.

4. The rendering system of claim 2, wherein the detection system outputs the result of detection in every first cycle, the processor renders, based on the result of detection in every first cycle, the marker at least in every first cycle and updates the marker in every second cycle, the second cycle being shorter than the first cycle, and the processor makes, whenever the marker is updated in every second cycle, interpolation based on interpolation data to obtain an interpolated marker as the marker that has been updated.

5. The rendering system of claim 1, wherein the marker is a three-dimensional image including location information in a depth direction and representing a distance from the detection system to the target.

6. The rendering system of claim 1, wherein the detection system outputs the result of detection in every first cycle, the processor renders, based on the result of detection in every first cycle, the marker at least in every first cycle and updates the marker in every second cycle, the second cycle being shorter than the first cycle, and the processor makes, whenever the marker is updated in every second cycle, interpolation based on interpolation data to obtain an interpolated marker as the marker that has been updated.

7. The rendering system of claim 1, wherein the processor determines contents of the marker based on the correction data, and the contents include at least one of a figure, a sign, a character, a numeral, a pattern, a photograph, or a combination thereof.

8. The rendering system of claim 1, wherein the functions further include:

adjusting a strength of the predicting of the location of the target.

9. The rendering system of claim 1, wherein the traveling information is about the traveling condition of the moving vehicle in a delay period, the delay period being at least from a first point in time when the detection system detects the target to a second point in time when the processor renders the marker.

10. A display system, comprising:

the rendering system of claim 1; and a display device that displays the marker rendered by the rendering system.

11. The rendering system of claim 1, wherein the traveling information further relates to at least one of a distance traveled or an angle of movement.

12. A rendering method, comprising:

determining, based on a result of detection by a detection system installed in a moving vehicle for a purpose of detecting a target, a rendering location of a marker corresponding to a location of the target, the moving vehicle being equipped with a rendering system;

predicting, based on traveling information and target information, the location of the target in order to obtain correction data for the location of the target;

correcting the rendering location of the marker based on the correction data of the target; and rendering, by the rendering system of the vehicle, the marker at the corrected rendering location, wherein the correction data is obtained based on the traveling information about a traveling condition of the moving vehicle and the target information about a traveling condition of the target, the traveling information is predicted from at least past behavior of the moving vehicle equipped with the rendering system, the target information is predicted from at least past behavior of the target, and the traveling information relates to at least one of parameters including a moving velocity, a magnitude of movement, a traveling direction, acceleration, a duration of traveling, or an orientation of the moving vehicle during traveling.

13. A non-transitory storage medium including a program configured to cause one or more processors to perform the rendering method of claim 12.

14. The rendering method of claim 12, wherein the traveling information further relates to at least one of a distance traveled or an angle of movement.

* * * * *